United States Patent [19]

Sagane et al.

[11] Patent Number: 5,770,655

[45] Date of Patent: Jun. 23, 1998

[54] POLYMER COMPOSITION AND CORE-SHELL ELASTOMER USED THEREFOR

[75] Inventors: Toshihiro Sagane, Tokyo; Masayuki Okabe; Masahiro Kishine, both of Yamaguchi-ken, all of Japan

[73] Assignees: Mitsui Petrochemical Industries, Ltd., Tokyo, Japan; Hoechst Aktiengesellschaft, Frankfurt, Germany

[21] Appl. No.: 696,799

[22] Filed: Aug. 14, 1996

Related U.S. Application Data

[62] Division of Ser. No. 401,911, Mar. 9, 1995, Pat. No. 5,574,100.

[30] Foreign Application Priority Data

Mar. 9, 1994 [JP] Japan .................................. 6-038860
Apr. 22, 1994 [JP] Japan .................................. 6-084833

[51] Int. Cl.$^6$ ................................................. C08F 51/04
[52] U.S. Cl. .......................... 525/310; 525/297; 525/305; 525/289; 525/902
[58] Field of Search ................................. 525/310, 297, 525/289, 305, 902

[56] References Cited

U.S. PATENT DOCUMENTS

| | | | |
|---|---|---|---|
| 4,614,778 | 9/1986 | Kajiura et al. | 526/281 |
| 4,918,133 | 4/1990 | Moriya et al. | 524/518 |
| 4,992,511 | 2/1991 | Yamamoto et al. | 525/97 |
| 5,179,171 | 1/1993 | Minami et al. | 525/288 |
| 5,225,503 | 7/1993 | Sagane | 526/169.2 |
| 5,270,393 | 12/1993 | Sagane | 525/210 |
| 5,288,802 | 2/1994 | Hinz | 525/279 |
| 5,298,551 | 3/1994 | Yamamoto | 524/218 |
| 5,376,746 | 12/1994 | Skoultchi | 526/196 |

FOREIGN PATENT DOCUMENTS

| | | |
|---|---|---|
| 0361909 | 9/1989 | European Pat. Off. . |
| 0485631 | 6/1991 | European Pat. Off. . |
| 0597119 | 5/1993 | European Pat. Off. . |
| 61-98780 | 5/1986 | Japan . |
| 61-115916 | 6/1986 | Japan . |
| 61-120816 | 6/1986 | Japan . |

Primary Examiner—Joseph L. Schofer
Attorney, Agent, or Firm—Birch, Stewart, Kolasch & Birch, LLP

[57] ABSTRACT

A polymer composition comprising [A] a polymer selected from a copolymer of α-olefin having at least 2 carbon atoms and a specific cyclic olefin, a ring-opening polymer of said specific cyclic olefin and a hydroganted, ring-opening polymer thereof and [B] a core-shell elastomer containing 40 to 85 parts of weight of a core component which comprises a styrene-butadiene copolymer and 15 to 60 parts by weight of a shell component which comprises a copolymer of an acrylate or methacrylate having a specific cyclic structure, a monovinyl aromatic monomer, other monovinyl monomer and a plyfunctional monomer. This polymer composition is excellent in transparency and impact resistance.

1 Claim, No Drawings

POLYMER COMPOSITION AND CORE-SHELL ELASTOMER USED THEREFOR

This application is a divisional of application Ser. No. 08/401,911, filed on Mar. 9, 1995, now U.S. Pat. No. 5,547,200, the entire contents of which are hereby incorporated by reference.

BACKGROUND OF THE INVENTION

1. Field of the Invention

This invention relates to a polymer composition and a core-shell elastomer used therefor. More specifically, the invention relates to a composition which comprises a cyclic structure-containing polymer and a core-shell elastomer which contains in a shell component a specific acrylate or methacrylate monomer as a constituent.

2. Prior Art

Heretofore, it has been well known that cyclic olefin random copolymers obtained by copolymerizing ethylene with a cyclic olefin such as tetracyclododecene or norbornene are synthetic resins which are excellent in transparency, whose heat resistance, heat aging resistance, chemical resistance, solvent resistance, dielectric properties and rigidity are well balanced, and which exhibit excellent performance in the field of optical materials such as optical memory disks and optical fibers. These copolymers have been proposed in JP-A-60-168708 (the term "JP-A" as used herein means an "unexamined published Japanese patent application"), JP-A-61-98780, JP-A-61-115912, JP-A-61-115916, JP-A-61-120816 and JP-A-62-252407. It is also known that the cyclic olefin random copolymers disclosed in these prior arts exhibit excellent performance in the field of structural materials.

However, although these cyclic olefin copolymers are superior in heat resistance and rigidity, they have room for improvement of their impact resistance. It is desired that impact resistance be improved while transparency of these cyclic olefin copolymers is retained.

JP-A-1-163241 proposes a composition comprising a cyclic olefin random copolymer having a specific softening temperature (TMA) and a specific α-olefin elastic copolymer as a resin whose impact resistance is improved without impairing excellent properties such as heat resistance, heat aging resistance and chemical resistance.

Further, a composition comprising a cyclic olefin copolymer which is composed of a product obtained by reacting a specific cyclic olefin random copolymer with a specific soft copolymer in the presence of an organic peroxide has been proposed in JP-A-2-167318 as a cyclic olefin copolymer composition having improved impact resistance.

However, the compositions comprising cyclic olefin copolymers as proposed in JP-A-1-163241 and JP-A-2-167318 have improved impact resistance, but their transparency is insufficient and hence, there is room for improvement.

SUMMARY OF THE INVENTION

A first object of the invention is to provide a cyclic olefin polymer composition.

Another object of the invention is to provide a cyclic olefin polymer composition comprising a core-shell elastomer which contains an acrylate or methacrylate monomer having a specific alicyclic skeleton as a constituent in the shell component.

Still another object of the invention is to provide a polymer composition comprising a cyclic olefin polymer whose impact resistance is improved without impairing inherent transparency characteristic of the cyclic olefin polymer and the above-mentioned core-shell elastomer.

A further object of the invention is to provide a core-shell elastomer which contains an acrylate or methacrylate monomer having the above-mentioned specific alicyclic skeleton as a constituent in the shell component.

According to the present invention, there is first provided a polymer composition comprising:

[A] a cyclic structure-containing polymer which is selected from the group consisting of

[A-1] a cyclic olefin random copolymer obtained by copolymerizing (i) at least one α-olefin having 2 or more carbon atoms with (ii) at least one cyclic olefin represented by the following formula [I]:

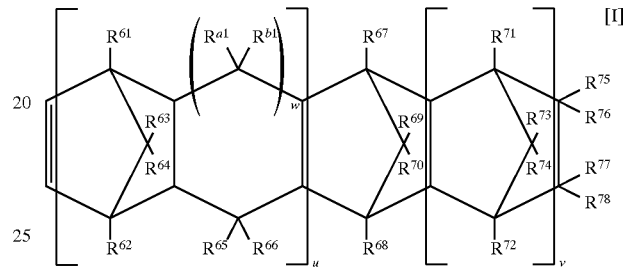

wherein u is 0 or 1, v is 0 or a positive integer, w is 0 or 1, $R^{61}$ to $R^{78}$ and $R^{a1}$ and $R^{b1}$ are independently selected from the group consisting of a hydrogen atom, a halogen atom and a hydrocarbon group, $R^{75}$ to $R^{78}$ may be bonded together to form a single ring or multiple rings, the single ring or the multiple rings may have a double bond, and $R^{75}$ and $R^{76}$, or $R^{77}$ and $R^{78}$ may form an alkylidene group, or the following formula [II]:

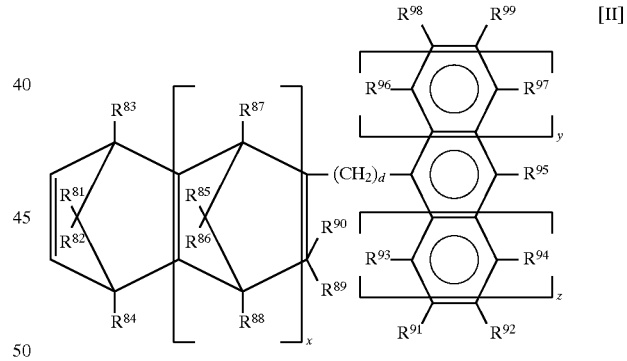

wherein x and d are 0 or an integer of 1 or more, y and z are each 0, 1 or 2, $R^{81}$ to $R^{99}$ are independently selected from the group consisting of a hydrogen atom, a halogen atom, an aliphatic hydrocarbon group, an alicyclic hydrocarbon group, an aromatic hydrocarbon group and an alkoxy group, the carbon atom to which $R^{89}$ and $R^{90}$ are bonded and the carbon atom to which R83 is bonded or the carbon atom to which $R^{91}$ is bonded may be bonded together directly or via an alkylene group having 1 to 3 carbon atoms, and $R^{85}$ and $R^{82}$, or $R^{85}$ and $R^{99}$ may be bonded together to form a single aromatic ring or multiple aromatic rings when y=z=0,

[A-2] a ring-opening polymer of at least one cyclic olefin represented by the above formula [I] or [II], and

[A-3] a hydrogenated, ring-opening polymer of at least one cyclic olefin represented by the above formula [I] or [II], and which has an intrinsic viscosity [η], measured in decalin at 135° C., of 0.05 to 5.0 dl/g, a glass transition temperature (Tg), measured by DSC, of 70° C. or more, and a refractive index ($n_D$), measured at 25° C., of 1.500 to 1.650; and

[B] a core-shell elastomer containing

[B-1] 40 to 85 parts by weight of a core component which comprises styrene-butadiene copolymer type rubber containing 50% or less by weight of styrene unit and

[B-2] 15 to 60 parts by weight of a shell component which comprises a (co)polymer having a unit derived from a monomer or a monomer mixture consisting of (b-1) 20 to 100% by weight of at least one acrylate or methacrylate monomer having an aliphatic skeleton selected from the group consisting of compounds represented by the following general formula [III]:

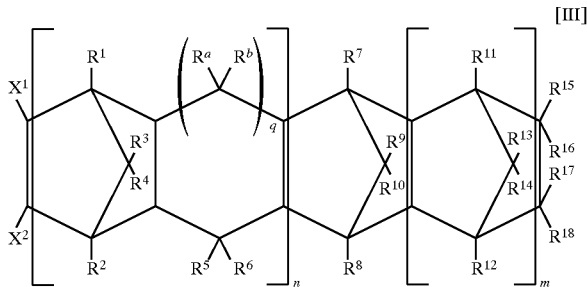

wherein n is 0 or 1, m is 0 or a positive integer, q is 0 or 1, $R^1$ to $R^{18}$ and $R^a$ and $R^b$ are independently selected from the group consisting of a hydrogen atom, a halogen atom and a hydrocarbon group, $R^{15}$ to $R^{18}$ may be bonded together to form a single ring or multiple rings, the single ring or the multiple rings may have a double bond, $R^{15}$ and $R^{16}$, or $R^{17}$ and $R^{18}$ may form an alkylidene group, either one of $X^1$ and $X^2$ is an acryloyloxy group or a methacryloyloxy group represented by the following formula [X]:

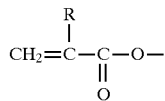

wherein R is a hydrogen atom or a methyl group, and the other is a hydrogen atom or an alkyl group; compounds represented by the following general formula [IV]:

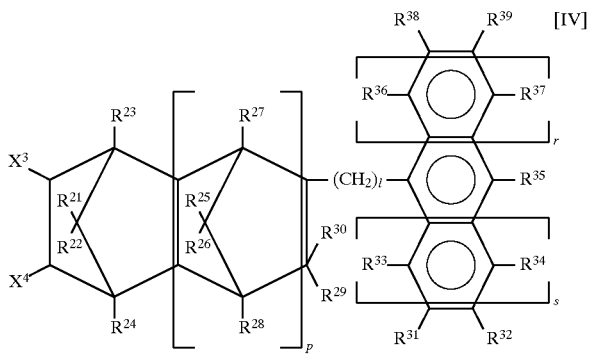

wherein p and are each 0 or an integer of 1 or more, r and s are 0, 1 or 2, $R^{21}$ to $R^{39}$ are independently selected from the group consisting of a hydrogen atom, a halogen atom, an aliphatic hydrocarbon group, an aromatic hydrocarbon group and an alkoxy group, the carbon atom to which $R^{29}$ and $R^{30}$ are bonded and the carbon atom to which $R^{33}$ is bonded or the carbon atom to which $R^{31}$ is bonded may be bonded together directly or via an alkylene group having 1 to 3 carbon atoms, $R^{35}$ and $R^{32}$, or $R^{35}$ and $R^{39}$ may be bonded together to form a single aromatic ring or multiple aromatic rings when r=s=0, either one of $X^3$ and $X^4$ is an acryloyloxy group or a methacryloyloxy group represented by the above formula [X], and the other is a hydrogen atom or an alkyl group;

and compounds represented by the following formula [V]:

wherein t is 4 or 5, $R^{41}$ to $R^{43}$ are independently selected from the group consisting of a hydrogen atom, a halogen atom and a hydrocarbon group, and $X^5$ is an acryloyloxy group or methacryloyloxy group represented by the above formula [X], (b-2) 0 to 70 % by weight of a monovinyl aromatic monomer, (b-3) 0 to 70 % by weight of other monovinyl monomer copolymerizable with these monomers, and (b-4) 0 to 3 % by weight of a polyfunctional monomer, the total of the core component [B-1] and the shell component [B-2] being 100 parts by weight, and which has an average diameter of primary particles of 100 to 300 nm, wherein the weight ratio of the component [A] to the component [B] is in the range of 40/60 to 95/5.

This polymer composition is referred to as "first polymer composition" hereinafter.

According to the present invention, there is secondly provided a core-shell elastomer [B] used as a component of the first polymer composition.

According to the present invention, there is thirdly provided a polymer composition comprising:

[A] a cyclic structure-containing polymer which is selected from the group consisting of [A-1] a cyclic olefin random copolymer obtained by copolymerizing (i) at least one α-olefin having 2 or more carbon atoms with (ii) at least one cyclic olefin represented by the above formula [I] or [II], [A-2] a ring-opening polymer of at least one cyclic olefin represented by the above formula [I] or [II], and [A-3] a hydrogenated, ring-opening polymer of at least one cyclic olefin represented by the above formula [I] or [II], and which has an intrinsic viscosity [η], measured in decalin at 135° C., of 0.05 to 5.0 dl/g, a glass transition temperature (Tg), measured by DSC, of 70° C. or more, a refractive index ($n_D$), measured at 25° C., of 1.500 to 1.650;

[B'] a core-shell elastomer which contains [B'-1] 40 to 85 parts by weight of a core component which comprises styrene-butadiene copolymer type rubber containing 50% or less by weight of styrene unit, [B'-2] 15 to 60 parts by weight of a shell component which comprises a copolymer having a unit derived from a monomer mixture consisting of (b-2) 20 to 80% by weight of a monovinyl aromatic monomer, (b-3) 20 to 80% by weight of other monovinyl monomer, and (b-4) 0 to 3% by weight of a polyfunctional monomer, the total of the core component [B'-1] and the shell component [B'-2] being 100 parts by weight, and which has an average diameter of primary particles in the range of 100 to 300 nm; and

[C] a fluid lubricant, wherein the weight ratio of the component [A] to the component [B'] is in the range of 40/60 to 95/5, and the component [C] is contained in an amount of 1 to 20 parts by weight based on 100 parts by weight of the total of the components [A] and [B'].

This polymer composition is referred to as "second polymer composition" hereinafter.

The above-mentioned objects of the present invention can be attained by these polymer compositions.

Other objects and advantages of the present invention will be more apparent from the following detailed description.

In the chemical structural formulas representing compounds through the present specification, lines represent the same type of bonds, irrespective of width of lines.

DETAILED DESCRIPTION OF THE INVENTION

A description is first given of the first polymer composition and the core-shell elastomer [B] used therefor.

The core-shell elastomer [B] used in the first polymer composition can be prepared by graft polymerizing [B-1'] 40 to 85 parts by weight of styrene-butadiene copolymer type rubber latex containing 50% or less by weight of styrene unit with [B-2'] 15 to 60 parts by weight of a monomer or a monomer mixture consisting of (b-1) 20 to 100% by weight of at least one acrylate or methacrylate monomer having an alicyclic skeleton and selected from the group consisting of compounds represented by the above formulas [III], [IV] and [V], (b-2) 0 to 70% by weight of a monovinyl aromatic monomer, (b-3) 0 to 70% by weight of other monovinyl monomer, and (b-4) 0 to 3% by weight of a polyfunctional monomer. The total of the latex [B-1'] and the monomers or the monomer mixtures [B-2'] is 100 parts by weight. This process is referred to as "first production process" hereinafter.

Further, according to the present invention, as another process for producing the core-shell elastomer [B], there is provided a production process in which the core-shell elastomer [B] is prepared by graft polymerizing 100 parts by weight of a core-shell elastomer which contains [B-1] 40 to 85 parts by weight of a core component which comprises styrene-butadiene copolymer type rubber containing 50% or less by weight of styrene unit and [B-2"] 15 to 60 parts by weight of a shell component which comprises a copolymer having a unit derived from a monomer mixture of (b-2) 20 to 80% by weight of a monovinyl aromatic monomer, (b-3) 20 to 80% by weight of other monovinyl monomer, and (b-4) 0 to 3% by weight of a polyfunctional monomer, the total of the core component [B-1] and the shell component [B-2"] being 100 parts by weight, with [B-2'''] 5 to 100 parts by weight of at least one acrylate or methacrylate monomer having an alicyclic skeleton and selected from the group consisting of the compounds represented by the above formulas [III], [IV] and [V]. This process is referred to as "second production process" hereinafter.

A description is subsequently given of the first production process.

The styrene-butadiene copolymer type rubber latex [B-1'] containing 50% or less by weight of styrene unit is generally obtained by emulsion polymerization. The content of the styrene unit is 50% or less by weight, preferably 30% or less by weight. Known emulsion polymerization processes include a seed polymerization process. In the production of the rubber latex, the known molecular weight modifier and crosslinking agent may be added. Illustrative examples of the crosslinking agent include crosslinking monomers such as divinylbenzene; polybasic esters having at least two vinyl groups such as divinyladipate; di- and tri-methacrylates of polyhydric alcohol (or di- or tri-acrylates of polyhydric alcohol) such as mono- or polyethylene glycol dimethacrylate; divinyl ethers of polyhydric alcohol such as ethylene glycol divinyl ether; di- or tri-allyl esters of polybasic acid such as diallyl phthalate, diallyl maleate, diallyl fumarate and diallyl sebacate; triallyl compounds such as diallyl ether, triallyl cyanurate and triallyl isocyanurate; allyl esters of polymerizable carboxylic acid such as aryl methacrylate, allyl acrylate, allyl itaconate, monoallyl fumarate and monoallyl aleate; and the like. The crosslinking polymer is preferably used in an amount of 3% or less by weight.

The other vinyl monomer copolymerizable with styrene and butadiene may be used in an amount of 3% or less by weight, with examples thereof including cyanogen compounds having a vinyl group such as acrylonitrile, alkyl esters of acrylic acid or methacrylic acid and the like.

The rubber latex [B-1'] used in the present invention has an average diameter of primary particles preferably in the range of 50 to 250 nm, more preferably 60 to 200 nm.

By using such rubber latex, the core-shell elastomer can have an average diameter of primary particles of 100 to 300 nm, preferably 150 to 250 nm.

The monomer or the monomer mixture [B-2'] to be graft copolymerized with this rubber latex is selected from the group consisting of acrylate or methacrylate monomers having an alicyclic skeleton and represented by the above formulas [III], [IV] and [V].

A description is subsequently given of the compounds represented by the above formulas [III], [IV] and [V].

In the formula [III], n is 0 or 1, m is 0 or a positive integer, and q is 0 or 1. When q is 1, the ring indicated by using q becomes a 6-membered ring, whereas, when q is 0, this ring becomes a 5-membered ring.

$R^1$ to $R^{18}$ and $R^a$ and $R^b$ are independently selected from the group consisting of a hydrogen atom, a halogen atom and a hydrocarbon group.

In this instance, the halogen atom is a fluorine, chlorine, bromine or iodine atom.

Specific examples of the hydrocarbon group include an alkyl group having 1 to 20 carbon atoms, an alkyl halide group having 1 to 20 carbon atoms, a cycloalkyl group having 3 to 15 carbon atoms and an aromatic hydrocarbon group. Specific examples of the alkyl group include a methyl, ethyl, propyl, isopropyl, amyl, hexyl, octyl, decyl, dodecyl and octadecyl group. These alkyl groups may be substituted with a halogen atom.

Examples of the cycloalkyl group include a cyclohexyl group.

Examples of the tic hydrocarbon group include a phenyl group and a naphthyl group.

In the above formula [III], $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be bonded together to form a single ring or multiple rings, and the single ring or the multiple rings thus formed may have a double bond. Illustrative example of the single ring or the multiple rings formed herein include:

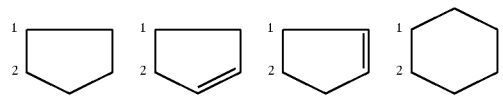

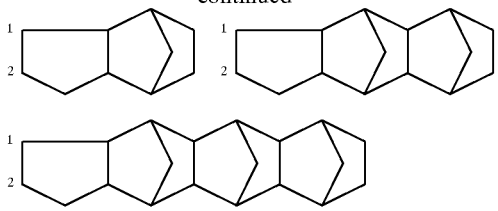

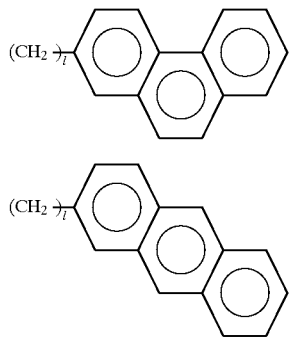

In the above examples, the carbon atom denoted at numeral 1 or 2 represents a carbon atom to which $R^{15}$ ($R^{16}$) or $R^{17}$ ($R^{18}$) is bonded in the formula [III]. $R^{15}$ and $R^{16}$, or $R^{17}$ and $R^{18}$ may form an alkylidene group. This alkylidene group generally has 2 to 20 carbon atoms, with illustrative examples thereof including an ethylidene group, a propylidene group and an isopropylidene group.

Either one of $X^1$ and $X^2$ is an acryloyloxy group or methacryloyloxy group represented by the above formula [X] and the other is a hydrogen atom or an alkyl group such as an alkyl group having 1 to 20 carbon atoms.

In the formula [IV], p and l are 0 or a positive integer, preferably an integer of 0 to 3, r and s are 0, 1 or 2.

$R^{21}$ to $R^{39}$ are independently selected from the group consisting of a hydrogen atom, a halogen atom, an aliphatic hydrocarbon group, an aromatic hydrocarbon group and an alkoxy group.

Illustrative examples of the halogen atom are the same as those provided for the halogen atom of the above formula [III]. Illustrative examples of the aliphatic hydrocarbon group include an alkyl group having 1 to 20 carbon atoms and a cycloalkyl group having 3 to 15 carbon atoms. Specific examples of the alkyl group include a methyl, ethyl, propyl, isopropyl, amyl, hexyl, octyl, decyl, dodecyl and octadecyl group. These alkyl groups may be substituted with a halogen atom.

Examples of the cycloalkyl group include a cyclohexyl group.

Examples of the aromatic hydrocarbon group include an aryl group and an aralkyl group, and the preferred are those having 6 to 10 carbon atoms. Specific examples are a phenyl, tolyl, naphthyl, benzyl and phenylethyl.

Preferred examples of the alkoxy group are those having 1 to 3 carbon atoms such as a methoxy group, an ethoxy group and a propoxy group.

The carbon atom to which $R^{29}$ and $R^{30}$ are bonded and the carbon atom to which $R^{33}$ is bonded or the carbon atom to which $R^{31}$ is bonded may bonded together directly or via an alkylene group having 1 to 3 carbon atoms. That is, when the two carbon atoms are bonded together via an alkylene group, $R^{29}$ and $R^{33}$ or $R^{30}$ and $R^{31}$ jointly form an alkylene group out of a methylene group (—$CH_2$—), ethylene group (—$CH_2CH_2$—), and propylene group (—$CH_2CH_2CH_2$—).

Further, when r=s=0, $R^{35}$ and $R^{32}$, or $R^{35}$ and $R^{39}$ may be bonded together to form a single aromatic ring or multiple aromatic rings. Specifically, when r=s=0, the following aromatic rings may be formed by $R^{35}$ and $R^{32}$:

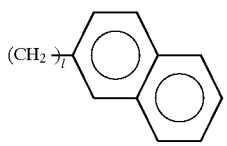

wherein l is the same as in the above formula [IV].

Either one of $X^3$ and $X^4$ is an acryloyloxy group or methacryloyloxy group represented by the above formula [X] and the other is a hydrogen atom or an alkyl group.

Further, in the formula [V], t is 4 or 5, and the compound of the formula [V] is a compound having a 5-membered ring when t is 4 and a 6-membered ring when t is 5.

$R^{41}$, $R^{42}$ and $R^{43}$ are independently selected from the group consisting of a hydrogen atom, a halogen atom and a hydrocarbon group.

Examples of the halogen atom are the same as those provided for the formula [III].

Examples of the hydrocarbon group include an alkyl group having 1 to 20 carbon atoms, a cycloalkyl group having 3 to 15 carbon atoms and an aromatic hydrocarbon group. Illustrative examples of each of these groups are the same as those provided for $R^{21}$ to $R^{39}$ of the formula [IV].

$X^5$ is an acryloyloxy group or methacryloyloxy group represented by the above formula [X].

Specific examples of the compound represented by the above formula [III] include the following compounds: (100) tetracyclo[$4.4.0.1^{2,5}.1^{7,10}$]dodecyl-3-acrylate

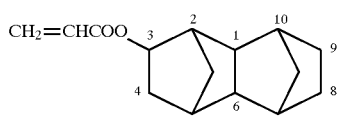

(101) 9-substituted tetracyclo[$4.4.0.1^{2,5}.1^{7,10}$]dodecyl-3-acrylate

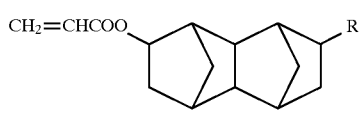

R=methyl, ethyl, propyl, isobutyl, hexyl, cyclohexyl, stearyl, bromo, fluoro, ethylidene, propylidene, isopropylidene (102) 8-substituted tetracyclo[$4.4.0.1^{2,5}.1^{7,10}$]dodecyl-3-acrylate

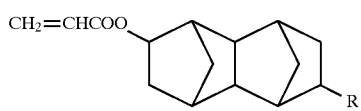

R=methyl, ethyl, propyl, isobutyl, hexyl, cyclohexyl, stearyl, bromo, fluoro, ethylidene, propylidene, isopropylidene (103) 8,9-substituted tetracyclo[4.4.0.1$^{2,5}$.1$^{7,10}$]dodecyl-3-acrylate

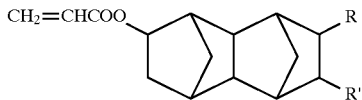

R, R'=methyl, ethyl, propyl, isobutyl, hexyl, cyclohexyl, stearyl, bromo, fluoro, ethylidene, propylidene, isopropylidene (104) 2,7-dimethyltetracyclo[4.4.0.1$^{2,5}$.1$^{7,10}$]dodecyl-3-acrylate

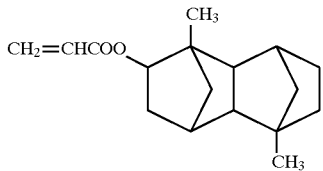

(105) 2,10-dimethyltetracyclo[4.4.0.1$^{2,5}$.1$^{7,10}$]dodecyl-3-acrylate

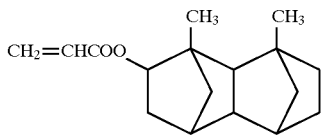

(106) 11,12-dimethyltetracyclo[4.4.0.1$^{2,5}$.1$^{7,10}$]-dodecyl-3-acrylate

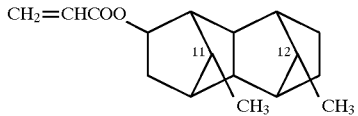

(107) hexacyclo[6.6.1.1$^{3,6}$.1$^{10,13}$.0$^{2,7}$.0.$^{9,14}$]heptadecyl-4-acrylate

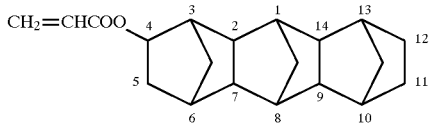

(108) 12-methylhexacyclo[6.6.1.1$^{3,6}$.1$^{10,13}$.0$^{2,7}$.0.$^{9,14}$]heptadecyl-4-acrylate

(109) 11-methylhexacyclo[6.6.1.1$^{3,6}$.1$^{10,13}$.0$^{2,7}$.0.$^{9,14}$]heptadecyl-4-acrylate

(110) 12-ethylhexacyclo[6.6.1.1$^{3,6}$.1$^{10,13}$.0$^{10,13}$.0$^{2,7}$.0.$^{9,14}$]heptadecyl-4-acrylate

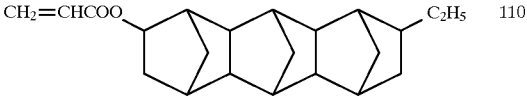

(111) 11-ethylhexacyclo[6.6.1.1$^{3,6\cdot}$.1$^{10,13}$.0$^{2,7}$.0.$^{9,14}$]heptadecyl-4-acrylate

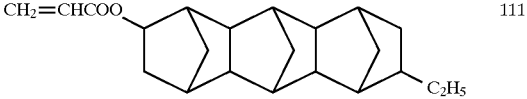

(112) octacyclo[8.8.1$^{2,9}$.1$^{4,7}$.1$^{11,18}$.1$^{13,16}$.0.0$^{3,8}$.0$^{12,17}$]docosyl-5-acrylate

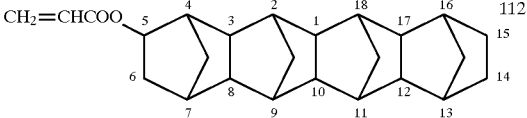

(113) 15-methyoctacyclo[8.8.1$^{2,9}$.1$^{4,7}$.1$^{11,18}$.1$^{13,16}$.0.0$^{3,8}$.0$^{12,17}$]docosyl-5-acrylate

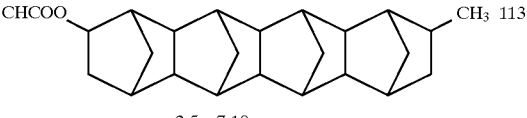

(114) tetracyclo[4.4.0.1$^{2,5}$.1$^{7,10}$]dodecyl-3-methacrylate

(115) 9-substituted tetracyclo[4.4.0.1$^{2,5}$.1$^{7,10}$]dodecyl-3-methacrylate

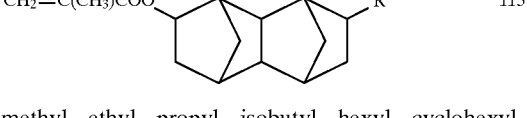

R=methyl, ethyl, propyl, isobutyl, hexyl, cyclohexyl, stearyl, bromo, fluoro, ethylidene, propylidene, isopropylidene (116) 8-substituted tetracyclo[4.4.0.1$^{2,5}$.1$^{7,10}$]dodecyl-3-methacrylate

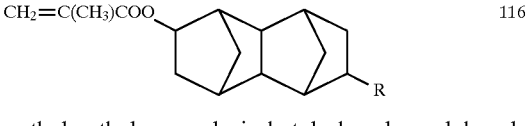

R=methyl, ethyl, propyl, isobutyl, hexyl, cyclohexyl, stearyl, bromo, fluoro, ethylidene, propylidene, isopropylidene (117) 8,9-substituted tetracyclo[4.4.0.1$^{2,5}$.1$^{7,10}$]dodecyl-3-methacrylate

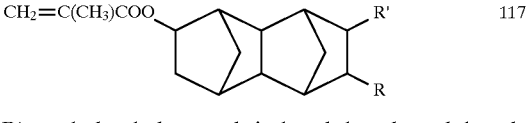

R, R'=methyl, ethyl, propyl, isobutyl, hexyl, cyclohexyl, stearyl, bromo, fluoro, ethylidene, propylidene, isopropylidene (118) 2,7-dimethyltetracyclo[4.4.0.1$^{2,5}$.1$^{7,10}$]dodecyl-3-methacrylate

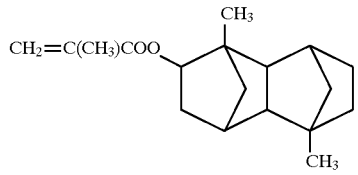

(119) 2,10-dimethyltetracyclo[4.4.0.1$^{2,5}$.1$^{7,10}$]dodecyl-3-methacrylate

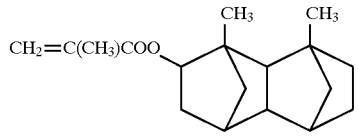

(120) 11,12-dimethyltetracyclo[4.4.0.1$^{2,5}$.1$^{7,10}$]dodecyl-3-methacrylate

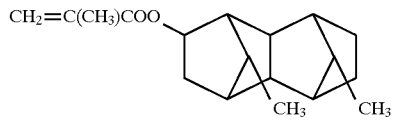

(121) hexacyclo[6.6.1.1$^{3,6}$.1$^{10,13}$.0$^{2,7}$.0$^{9,14}$]heptadecyl-4-methacrylate

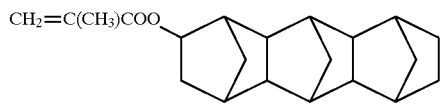

(122) 12-methylhexacyclo[6.6.1.1$^{3,6}$.1$^{10,13}$.0$^{2,7}$.0$^{9,14}$]heptadecyl-4-methacrylate

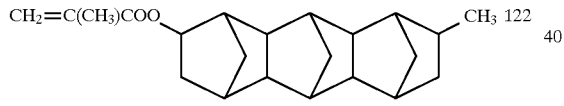

(123) 11-methylhexacyclo[6.6.1.1$^{3,6}$.1$^{10,13}$.0$^{2,7}$.0$^{9,14}$]heptadecyl-4-methacrylate

(124) 12-ethylhexacyclo[6.6.1.1$^{3,6}$.1$^{10,13}$.0$^{2,7}$.0$^{9,14}$]heptadecyl-4-methacrylate

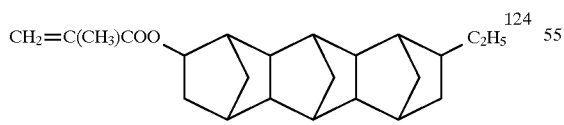

(125) 11-ethylhexacyclo[6.6.1.1$^{3,6}$.1$^{10,13}$.0$^{2,7}$.0$^{9,14}$]heptadecyl-4-methacrylate

(126) octacyclo[8.8.1$^{2,9}$.1$^{4,7}$.1$^{11,8}$.1$^{13,16}$.0.0$^{3,8}$.0$^{12,17}$]docosyl-5-methacrylate

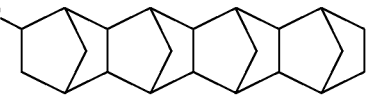

(127) 15-methyloctacyclo[8.8.1$^{2,9}$.1$^{4,7}$.1$^{11,18}$.1$^{13,16}$.0.0$^{3,8}$.0$^{12,17}$] docosyl-5-methacrylate

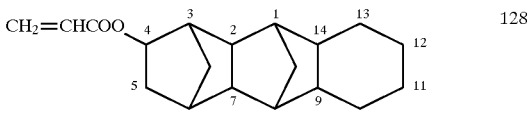

(128) pentacyclo[6.6.1.1$^{3,6}$.0$^{2,7}$.0$^{9,14}$]hexadecyl-4-acrylate

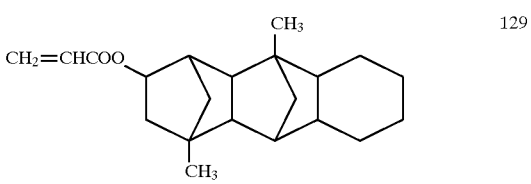

(129) 1,6-dimethylpentacyclo[6.6.1.1$^{3,6}$.0$^{2,7}$.0$^{9,14}$]hexadecyl-4-acrylate

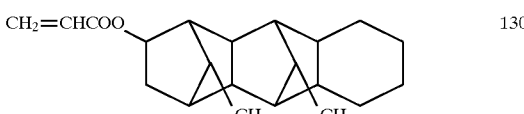

(130) 15,16-dimethylpentacyclo[6.6.1.1$^{3,6}$.0$^{2,7}$.0$^{9,14}$]hexadecyl-4-acrylate

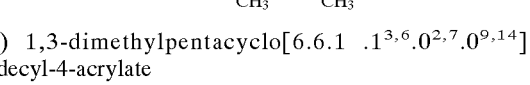

(131) 1,3-dimethylpentacyclo[6.6.1 .1$^{3,6}$.0$^{2,7}$.0$^{9,14}$]hexadecyl-4-acrylate

(132) pentacyclo[6.5.1.1$^{3,6}$.0$^{2,7}$.0$^{9,13}$]pentadecyl-4-acrylate

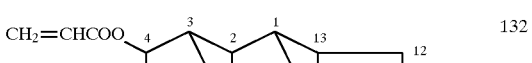

(133) 1,6-dimethylpentacyclo[6.5.1.1$^{3,6}$.0$^{2,7}$.0$^{9,13}$]pentadecyl-4-acrylate

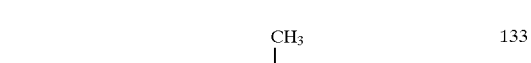

(134) 1,3-dimethylpentacyclo[$6.5.1.1^{3,6}.0^{2,7}.0^{9,13}$]pentadecyl-4-acrylate

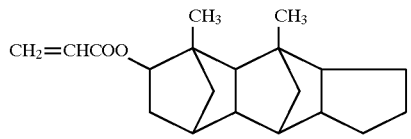

(135) 14,15-dimethylpentacyclo[$6.5.1.1^{3,6}.0^{2,7}.0^{9,13}$]pentadecyl-4-acrylate

(136) heptacyclo[$8.8.1^{2,9}.1^{4,7}.1^{11,18}.0.0^{3,8}.0^{12,17}$]heneicosyl-5-acrylate

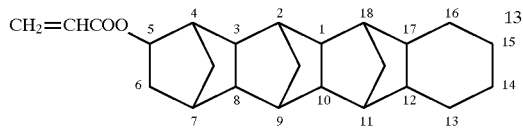

(137) heptacyclo[$8.7.1^{2,9}.1^{4,7}.1^{11,17}.0.0^{3,8}.0^{12,16}$]eicosyl-5-acrylate

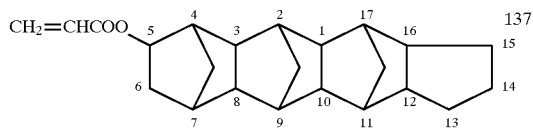

(138) pentacyclo[$6.6.1.1^{3,6}.0^{2,7}.0^{9,14}$]hexadecyl-4-methacrylate

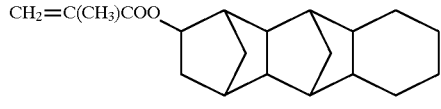

(139) 1,6-dimethylpentacyclo[$6.6.1.1^{3,6}.0^{2,7}.0^{9,14}$]hexadecyl-4-methacrylate

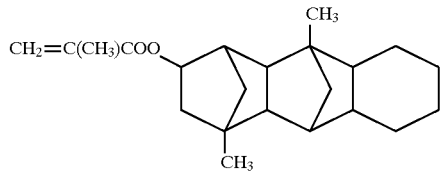

(140) 15,16-dimethylpentacyclo[$6.6.1.1^{3,6}.0^{2,7}.0^{9,14}$]hexadecyl-4-methacrylate

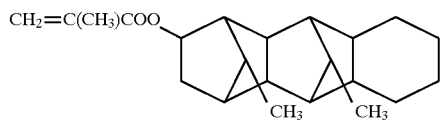

(141) 1,3-dimethylpentacyclo[$6.6.1.1^{3,6}.0^{2,7}.0^{9,14}$]hexadecyl-4-methacrylate

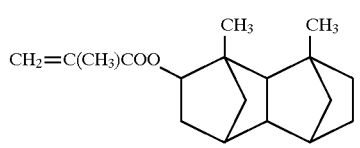

(142) pentacyclo[$6.5.1.1^{3,6}.0^{2,7}.0^{9,13}$]pentadecyl-4-methacrylate

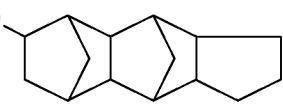

(143) 1,6-dimethylpentacyclo[$6.5.1.1^{3,6}.0^{2,7}.0^{9,13}$]pentadecyl-4-methacrylate

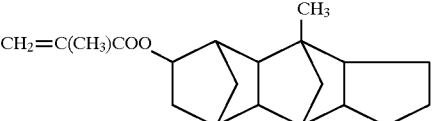

(144) 1,3-dimethylpentacyclo[$6.5.1.1^{3,6}.0^{2,7}.0^{9,13}$]pentadecyl-4-methacrylate

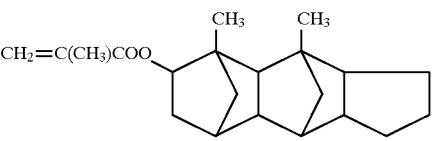

(145) 14,15-dimethylpentacyclo[$6.5.1.1^{3,6}.0^{2,7}.0^{9,13}$]pentadecyl-4-methacrylate

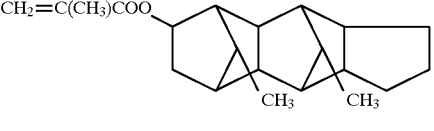

(146) heptacyclo[$8.8.1^{2,9}.1^{4,7}.1^{11,18}.0.0^{3,8}.0^{12,17}$]heneicosyl-5-methacrylate

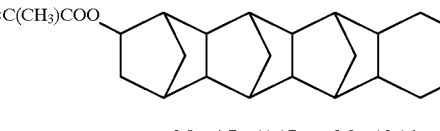

(147) heptacyclo[$8.7.1^{2,9}.1^{4,7}.1^{11,17}.0.0^{3,8}.0^{12,16}$]eicosyl-5-methacrylate

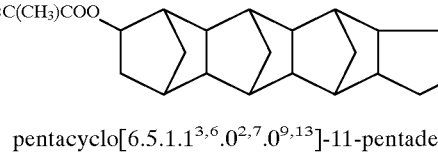

(148) pentacyclo[$6.5.1.1^{3,6}.0^{2,7}.0^{9,13}$]-11-pentadecenyl-4-acrylate

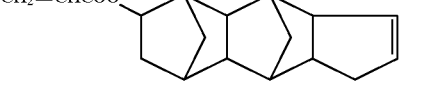

(149) pentacyclo[$6.5.1.1^{3,6}.0^{2,7}.0^{9,13}$]-11-pentadecenyl-4-methacrylate

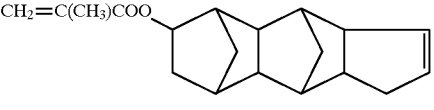

(150) pentacyclo[6.5.1.1$^{3,6}$.0$^{2,7}$.0$^{9,13}$]-10-pentadecenyl-4-methacrylate

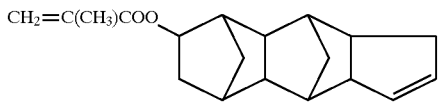

(151) pentacyclo[4.7.0.1$^{2,5}$.0$^{8,13}$.1$^{9,12}$]pentadecyl-3-acrylate

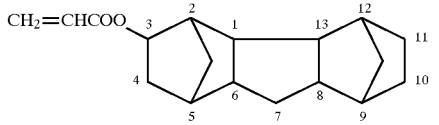

(152) pentacyclo[4.7.0.1$^{2,5}$.0$^{7,12}$.1$^{8,11}$]pentadecyl-3-acrylate

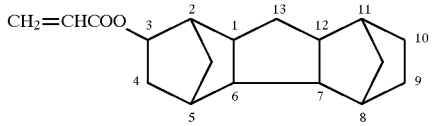

(153) heptacyclo[7.8.0.1$^{3,6}$.0$^{2,7}$.1$^{10,17}$.0$^{11,16}$.1$^{12,15}$]eicosyl-4-acrylate

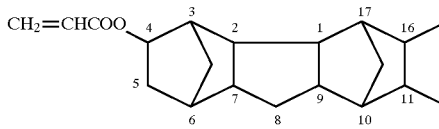

(154) heptacyclo[7.8.0.1$^{4,7}$.0$^{3,8}$. 1$^{10,17}$.0$^{11,16}$.1$^{12,15}$]eicosyl-5-acrylate

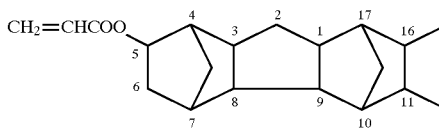

(155) nonacyclo[9.10.1.1$^{4,7}$.0$^{3,8}$.0$^{2,10}$.0$^{12,21}$.1$^{13,20}$.0$^{14,19}$.1$^{15,18}$]pentacosyl-5-methacrylate

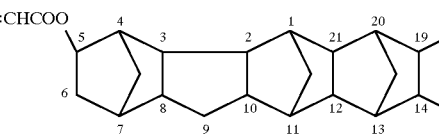

(156) nonacyclo[9.10.1.1$^{5,8}$.0$^{4,9}$.0$^{2,10}$.0$^{12,21}$.1$^{13,20}$.0$^{14,19}$.1$^{15,18}$]pentacosyl-6-methacrylate

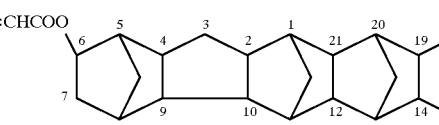

(157) pentacyclo[4.7.0.1$^{2,5}$.0$^{8,13}$.1$^{9,12}$]pentadecyl-3-methacrylate

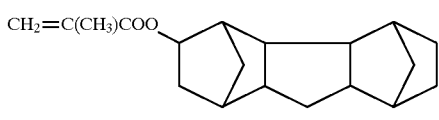

(158) pentacyclo[4.7.0.1$^{2,5}$.0$^{7,12}$.1$^{8,11}$]pentadecyl-3-methacrylate

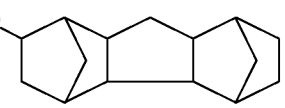

(159) heptacyclo[7.8.0.1$^{3,6}$.0$^{2,7}$.1$^{10,17}$.0$^{11,16}$. 1$^{12,15}$]eicosyl-4-methacrylate

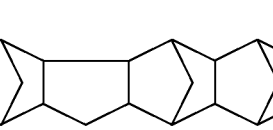

(160) heptacyclo[7.8.0.1$^{4,7}$.0$^{3,8}$.1$^{10,17}$.0$^{11,16}$.1$^{12,15}$]eicosyl-5-methacrylate

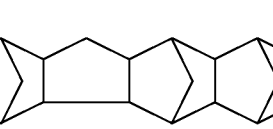

(161) nonacyclo[9.10. 1.1$^{4,7}$.0$^{3,8}$.0$^{2,10}$1$^{12,21}$.0$^{13,20}$.1$^{4,19}$.0$^{15,18}$]pentacosyl-5-methacrylate (162) nonacyclo[9.10.1.1$^{5,8}$.0$^{4,9}$.0$^{2,10}$.1$^{12,21}$.0$^{13,20}$.0$^{14,19}$.1$^{15,18}$]pentacosyl-6-methacrylate (163) bicyclo[2.2.1]heptyl-2-acrylate(norbonyl acrylate)

(164) 5-substituted bicyclo[2.2.1]heptyl-2-acrylate (substituted norbonyl acrylate)

R=methyl, ethyl, propyl, isobutyl, hexyl, cyclohexyl, stearyl, bromo, fluoro, ethylidene, propylidene, isopropylidene (165) 6-substituted bicyclo[2.2.1]heptyl-2-acrylate (substituted norbonyl acrylate)

The definition of R is the same as in compound (164).
(166) bicyclo[2.2.1]heptyl-2-methacrylate (norbonyl methacrylate)

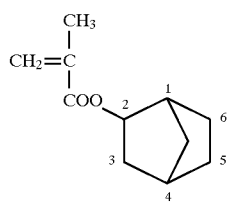

(167) 5-substituted bicyclo[2.2.1]heptyl-2-methacrylate (substituted norbonyl methacrylate)

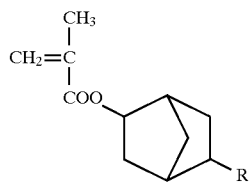

R=methyl, ethyl, propyl, isobutyl, hexyl, cyclohexyl, stearyl, bromo, fluoro, ethylidene, propylidene, isopropylidene (168) 6-substituted bicyclo[2.2.1]heptyl-2-methacrylate (substituted norbonyl methacrylate)

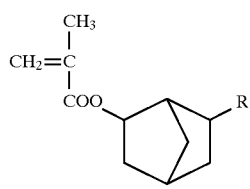

The definition of R is the same as in compound (167).
(169) isobornyl acrylate

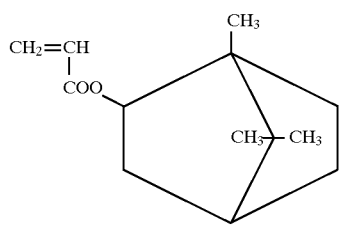

(170) isobornyl methacrylate

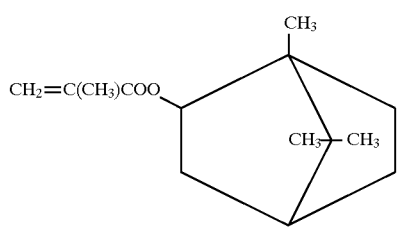

The compounds represented by the above formula [III] are known and disclosed in JP-A-3-79611, for example.

Specific examples of the compound represented by the above formula [IV] include the following compounds:

(201) 5(or 6)-phenyl-bicyclo[2.2.1]heptyl-2-acrylate

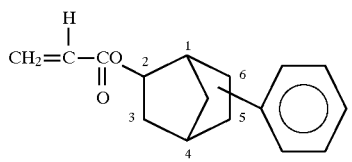

(202) 5(or 6)-methyl-5(or 6)-phenyl-bicyclo[2.2.1]heptyl-2-acrylate (a structure in which a phenyl group and a methyl group are bonded to site 5 is shown below)

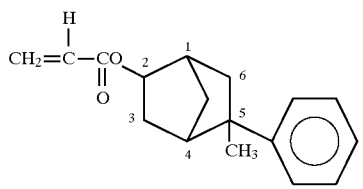

(203) 5(or 6)-benzyl-bicyclo[2.2.1]heptyl-2-acrylate

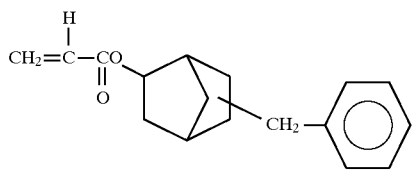

(204) 5(or 6)-(2-phenylethyl)-bicyclo[2.2.1]heptyl-2-acrylate

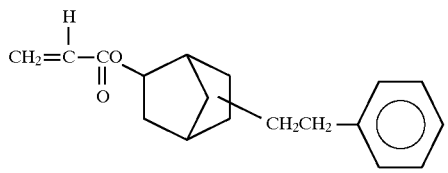

(205) 5(or 6)-tolyl-bicyclo[2.2.1]heptyl-2-acrylate

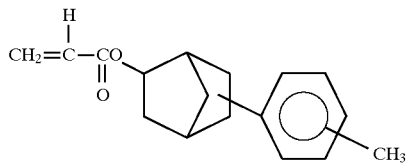

(206) 5(or 6)-(ethylphenyl)-bicyclo[2.2.1]heptyl-2-acrylate

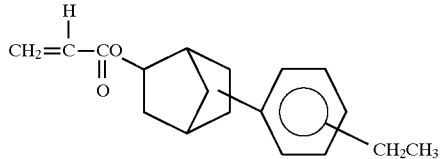

(207) 5(or 6)-(isopropylphenyl)-bicyclo[2.2.1]heptyl-2-acrylate

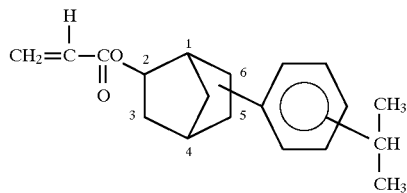

(208) 8,9-benzo-tricyclo[4.3.0.1^{2,5}]-decyl-3(or 4)-acrylate

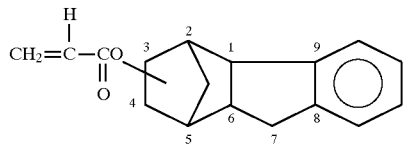

(209) 8,9-benzo-tricyclo[4.3.0.1^{2,5}]undecyl-3-acrylate

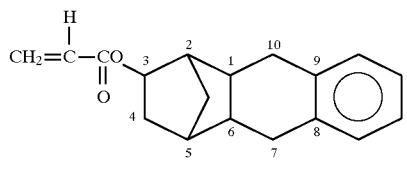

(210) compound obtained by introducing an acryloyloxy group to a cyclopentadiene-acenaphthylene adduct

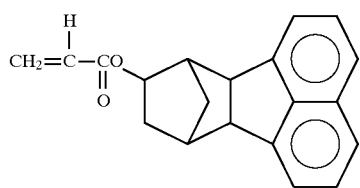

(211) 5(or 6)-(α-naphthyl)-bicyclo[2.2.1]heptyl-2-acrylate

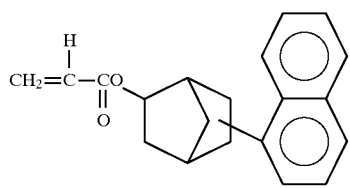

(212) 5(or 6)-(anthracenyl)-bicyclo[2.2.1]heptyl-2-acrylate

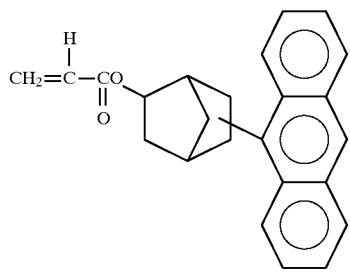

(213) 8(or 9)-phenyl-tetracyclo[4.4.0.1^{2,5}.1^{7,10}]dodecyl-3-acrylate

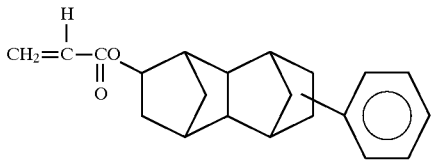

(214) 11(or 12)-phenyl-hexacyclo[6.6.1.1^{3,6}.1^{10,13}.0^{2,7}.0^{9,14}]heptadecyl-4-acrylate

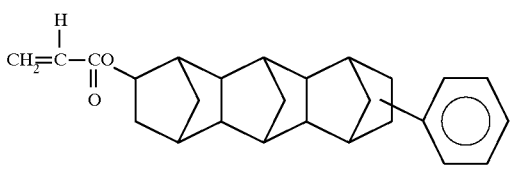

(215) 5(or 6)-phenyl-bicyclo[2.2.1]heptyl-2-methacrylate

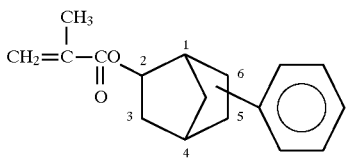

(216) 5(or 6)-methyl-5(or 6)-phenyl-bicyclo[2.2.1]heptyl-2-methacrylate (a structure in which a phenyl group and a methyl group are bonded to site 5 is shown below)

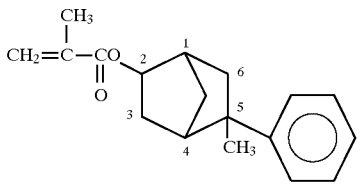

(217) 5(or 6)-benzyl-bicyclo[2.2.1]heptyl-2-methacrylate

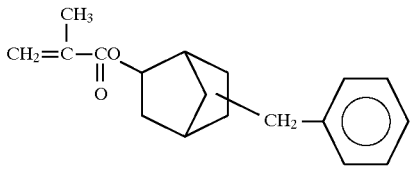

(218) 5(or 6)-(2-phenylethyl)-bicyclo[2.2.1]heptyl-2-methacrylate

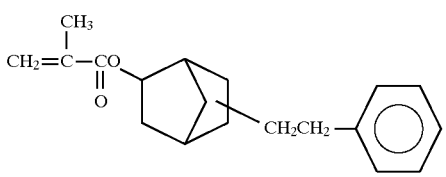

(219) 5(or 6)-tolyl-bicyclo[2.2.1]heptyl-2-methacrylate

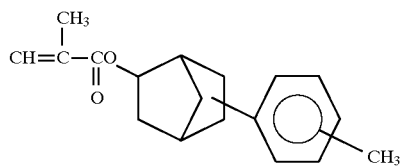

(220) 5(or 6)-(ethylphenyl)-bicyclo[2.2.1]heptyl-2-methacrylate

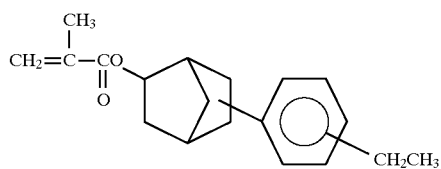

(221) 5(or 6)-(isopropylphenyl)-bicyclo[2.2.1]heptyl-2-methacrylate

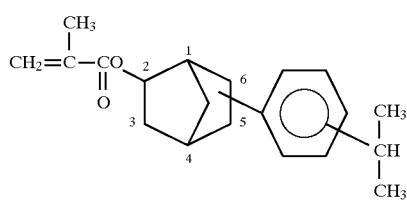

(222) 8,9-benzo-tricyclo[4.3.0.1$^{2,5}$]-decyl-3(or 4)-methacrylate

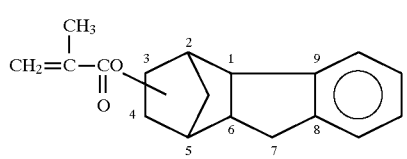

(223) 8,9-benzo-tricyclo[4.3.0.1$^{2,5}$]-undecyl-3-methacrylate

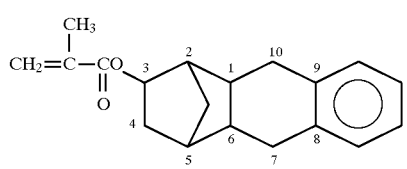

(224) compound obtained by introducing a methacryloyloxy group to a cyclopentadiene-acenaphthylene adduct

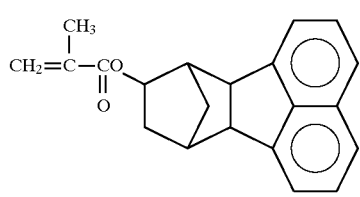

(225) 5(or 6)-(α-naphthyl)-bicyclo[2.2.1]heptyl-2-methacrylate

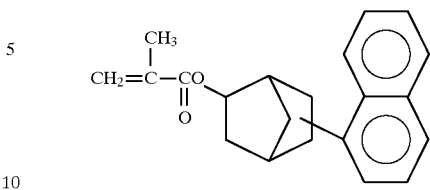

(226) 5(or 6)-(anthracenyl)-bicyclo[2.2.1]heptyl-2-methacrylate

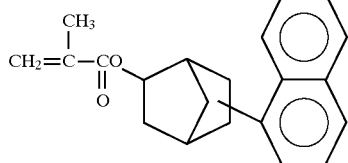

(227) 8(or 9)-phenyl-tetracyclo[4.4.0.1$^{2,5}$.1$^{7,10}$]dodecyl-3-methacrylate

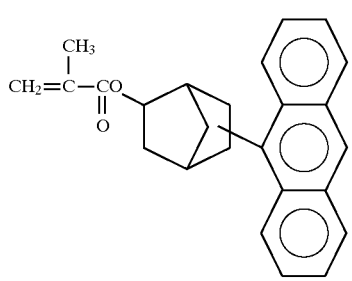

(228) 11(or 12)-phenyl-hexacyclo [6.6.1.1$^{3,6}$.1$^{10,13}$.0$^{2,7}$.0$^{9,14}$]heptadecyl-4-methacrylate

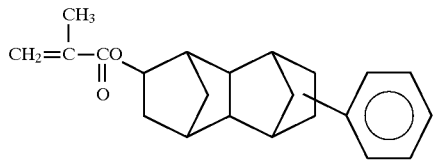

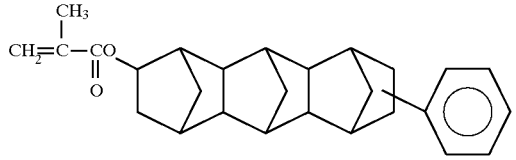

Multicyclic acrylate compounds having an aromatic group and represented by the above general formula [IV] can be identified by IR (infrared) spectroscopy and NMR (nuclear magnetic resonance) analysis. For instance, as for 5-phenyl-bicyclo[2.2.1]heptyl-2-methacrylate of the formula [IV] wherein p, l, r and s are 0, $R^{21}$ to $R^{39}$ and $X^4$ are each a hydrogen atom, and $X^3$ is a methacryloyloxy group, peaks derived from C=O bond and C=C bond of the methacryloyl group are observed at IR spectra of 1,725 cm$^{-1}$ and 1,635 cm$^{-1}$, respectively, and a peak derived from the phenyl group is observed at an IR spectrum of 700 cm$^{-1}$. A peak derived from the phenyl group is observed at an NMR spectrum of 7.1 to 7.3 ppm, a peak derived from the norbornene ring at 4.7 to 5.1 ppm, and a peak derived from the methacrylate ester at 5.5 to 6.5 ppm.

Monocyclic acrylate compounds having an aromatic group and represented by the above general formula [IV] are known and disclosed in JP-A-5-140231, for example.

Multicyclic acrylate compounds having an aromatic group and represented by the general formula [IV] are produced as follows, for example.

That is, acrylic acid, methacrylic acid or its ester forming derivative is reacted with a multicyclic alcohol represented by the following general formula [IV]-a and having a structure corresponding to a multicyclic acrylate compound or its ester forming derive.

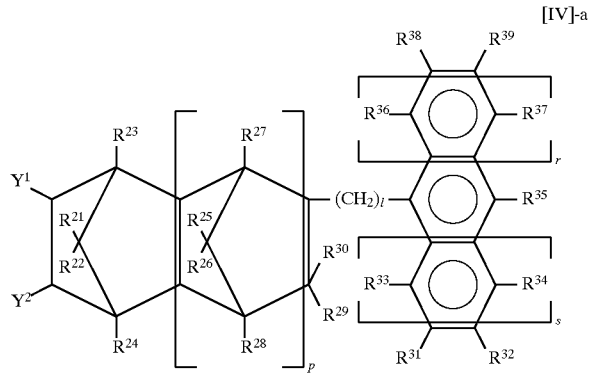

[IV]-a

In the above formula [IV]-a, the definitions of all the above symbols except $Y^1$ and $Y^2$ are the same as in the formula [IV]. Either one of $Y^1$ and $Y^2$ is a hydroxyl group and the other is a hydrogen atom or alkyl group.

A multicyclic alcohol represented by the general formula [IV]-a or its ester forming derivative may be produced by addition reacting formic acid with the unsaturated bond of a multicyclic olefin represented by the following general formula [IV]-b and having a structure corresponding to an alcohol compound represented by the above general formula [IV]-a to form a formate of the multicyclic olefin and then subjecting the formate to hydrolysis.

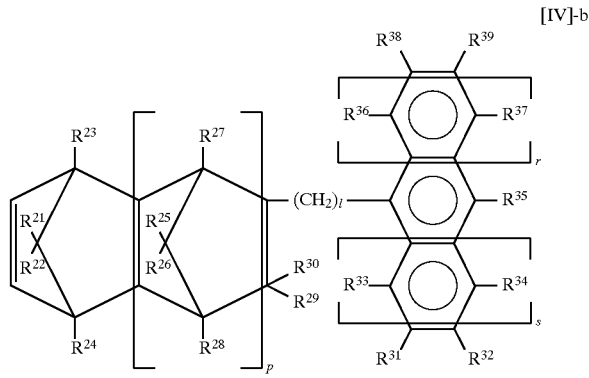

[IV]-b

In the above formula [IV]-b, the definitions of all the above symbols are the same as in the above formula [IV]. A method for preparing such a cyclic olefin will be described later in detail.

As for the reaction between the multicyclic olefin represented by the general formula [IV]-b and formic acid, a multicyclic olefin is generally reacted with a mixture of fumaric acid in a molar ratio of 1 to 10, preferably 2 to 6 with respect to the multicyclic olefin, at 50° to 200° C., preferably 70° to 150° C., particularly preferably under reflux of fumaric acid. In this reaction, the cyclic olefin represented by the general formula [IV]-b is added with fumaric acid at its double bond site to produce a formate of the multicyclic olefin. The formate of the multicyclic olefin is then subjected to hydrolysis at normal temperature to 100° C. using caustic alkali such as caustic soda in a water-ethanol mixed solvent to obtain a multicyclic alcohol represented by the general formula [IV]-a. At this time, the caustic alkali is preferably used in a molar ratio of 0.7 to 2, more preferably 1.0 to 1.5 with respect to the formate of the multicyclic olefin.

When the multicyclic alcohol represented by the above general formula [IV]-a is reacted with (i) acrylic acid or methacrylic acid, or (ii) an acrylate or methacrylate forming derivative, to form an ester, a multicyclic acrylate compound represented by the general formula [IV] can be obtained.

This esterification reaction is carried out under the following conditions.

For direct esterification reaction between the multicyclic alcohol represented by the general formula [IV]-a and (i) (meth)acrylic acid, the alcohol and the (meth)acrylic acid are preferably subjected to an esterification reaction at 60° to 150°C. at normal pressure in the presence of an acid catalyst while generated water is removed. Illustrative examples of the acid catalyst include sulfuric acid, p-toluenesulfonate, sulfonic acid type ion exchange resin, hydrochloric acid and the like.

For esterification reaction between the multicyclic alcohol of the formula [IV]-a and (ii) a (meth)acrylate forming derivative, the alcohol and a (meth)acrylate forming derivative are preferably subjected to an esterification reaction for a few hours at −10° to 30° C. at normal pressure. At this time, alkali such as triethylamine or sodium hydroxide may be added as a receptor for generated hydrochloric acid. Illustrative examples of the (meth)acrylate forming derivative include halides acrylate such as chloride acrylate and halides methacrylate such as chloride methacrylate.

The compound of the above formula [IV] may also be produced by the following second production method. That is, the compound may be obtained by addition reacting a multicyclic olefin represented by the above general formula [IV]-b and having a structure corresponding to the intended multicyclic acrylate compound with acrylic acid or methacrylic acid.

The multicyclic olefin represented by the above general formula [IV]-b may be prepared by subjecting a cyclopentadiene compound and an aromatic olefin having a reactive double bond site (or a derivative of norbornene having an aromatic group on a norbornene ring carbon atom) to a Diels-Alder reaction.

This reaction is concretely shown by the following formulas.

In the multicyclic olefin represented by the above general formula [IV]-b, when p is 0, the reaction is represented by the following formula.

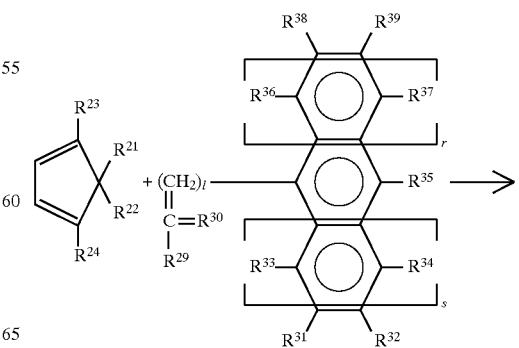

-continued

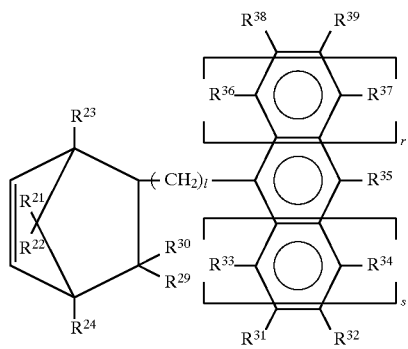

In the multicyclic olefin represented by the above rmula [IV]-b, when p is 1 or more, the reaction is represented by the following formula.

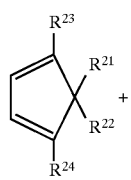

+

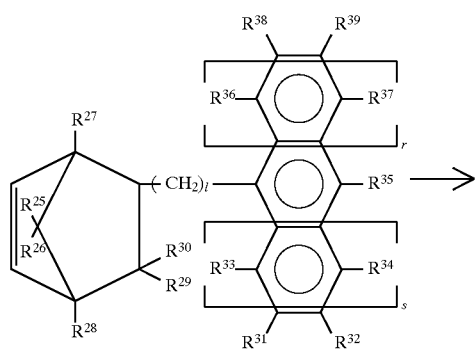

→

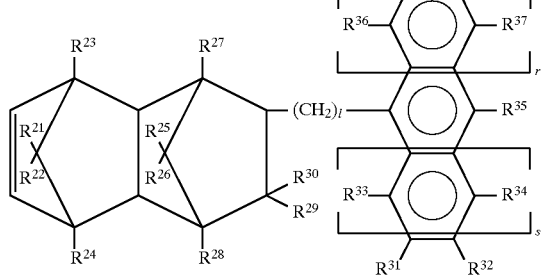

The reaction between the compound represented by the general formula [IV]-b and acrylic acid or methacrylic acid is carried out for a few hours at a reduced or increased pressure and at a temperature of 60° to 150° C. using an acid catalyst.

Illustrative examples of the acid catalyst include sulfuric acid, boron trifluoride, perfluoroacetate, polyphosphoric acid, active china clay, acid ion exchange resin and the like.

A multicyclic acrylate or methacrylate having an aromatic group and represented by the general formula [IV] according to the present invention can be obtained by the first or second production method as described above.

Illustrative examples of the compound represented by the above formula [V] include the following compounds:

(301) cyclopentyl acrylate

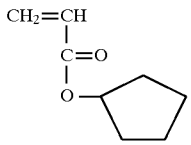

(302) cyclohexyl acrylate

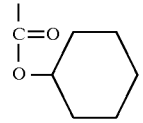

(303) methyl-substituted cyclohexyl acrylate

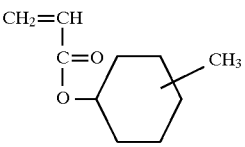

(304) cyclopentyl methacrylate

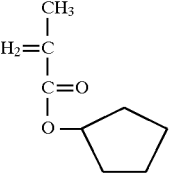

(305) cyclohexyl methacrylate

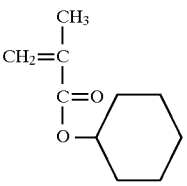

(306) methyl-substituted cyclohexyl methacrylate

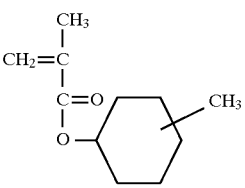

The compound represented by the above formula [V] may be produced by reacting a corresponding alicyclic alcohol or its ester forming derivative with acrylic acid, methacrylic acid or their ester forming derivative, or by addition reacting a corresponding alicyclic olefin with acrylic acid or methacrylic acid.

At least one acrylate or methacrylate monomer [B-2'] having an alicyclic skeleton and selected from the group consisting of compounds represented by the above formulae [III], [IV] and [V] is graft polymerized with styrene-butadiene copolymer type rubber latex [B-1'] which contains 50% or less by weight of styrene unit.

In the graft polymerization, a monomer or monomer mixture which consists of (b-2) a monovinyl aromatic monomer, (b-3) other monovinyl monomer copolymerizable with these monomers and (b-4) a polyfunctional monomer may be used together with the acrylate or methacrylate monomer.

As the monovinyl aromatic monomer (b-2), a compound represented by the following formula is preferably used.

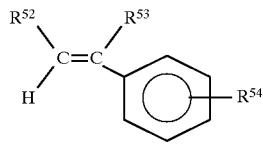

In the above formula, $R^{52}$, $R^{53}$ and $R^{54}$ may be the same or different and are each a hydrogen atom or a lower alkyl group having 1 to 3 carbon atoms, with illustrative examples thereof including styrene, α-methylstyrene, o-methylstyrene, m-methylstyrene, p-methylstyrene, m-ethylstyrene, p-ethystyrene, o-isopropylstyrene, m-isopropylstyrene, p-isopropylstyrene and the like.

The above compounds may be used alone or in combination of two or more.

Preferred examples of the other copolymerizable monovinyl monomer (b-3) include (meth)acrylate, α,β-unsaturated carboxylic acid, vinylether and ethylene derivatives having a halogen atom or cyano group. Illustrative examples of the (meth)acrylate include monomers represented by the following general formula.

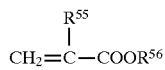

In the above formula, $R^{55}$ is a hydrogen atom or a methyl group, $R^{56}$ is a hydrocarbon group having 1 to 10 carbon atoms. The hydrogen atom of the methyl group or the hydrocarbon group may be substituted with a substituent. Specific examples of the substituent include a hydroxyl group (—OH), epoxy group, halogen, oxymethylene group, oxyethylene group and the like.

Illustrative examples of the (meth)acrylate include (meth)acrylates such as methyl (meth)acrylate, ethyl (meth)acrylate, propyl (meth)acrylate, isopropyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, cyclohexyl (meth)acrylate, benzyl (meth)acrylate, hydroxyethyl (meth)acrylate, 2-hydroxypropyl (meth)acrylate, 3-hydroxylpropyl (meth)acrylate, 2-hydroxy-3-phenoxypropyl (meth)acrylate, 3-chloro-2-hydroxypropyl (meth)acrylate, glycerin mono (meth)acrylate, pentaerythritol mono(meth)acrylate, trimethylolpropane mono(meth)acrylate, tetramethylolethane mono(meth)acrylate, butenediol mono(meth)acrylate, polyethylene glycol mono(meth)acrylate, 2-(6-hydroxyhexanoyloxy)ethyl (meth)acrylate, glycidyl (meth)acrylate and the like.

The above compounds may be used alone or in combination of two or more.

Illustrative examples of the α,β-unsaturated carboxylic acid include acrylic acid, methacrylic acid, α-ethyl acrylate, maleic acid, fumaric acid, itaconic acid, citraconic acid, tetrahydrophthalic acid, methyltetrahydrophthalic acid, endocis-bicyclo[2.2.1]hepto-5-en-2,3-dicarboxylic acid (Nadic Acid (trade name)), methyl-endocis-bicyclo[2.2.1]hepto-5-en-2,3-dicarboxylic acid (Methyl Nadic Acid (trade name)) and halides carboxylate as described above.

Illustrative examples of the α,β-unsaturated carboxylic acid derivative include amides, imides and acid anhydrides of α,β-unsaturated carboxylic acid. Specific examples include malenyl chloride, maleimide, maleic anhydride, citraconic anhydride, monomethyl maleate, dimethyl maleate and the like.

The above α,β-unsaturated carboxylic acids and derivatives thereof may be used alone or in combination of two or more.

Illustrative examples of the vinyl ether include monomers represented by the following formula:

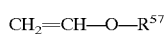

$$CH_2=CH-O-R^{57}$$

wherein $R^{57}$ is an alkyl group having 1 to 20 carbon atoms.

Illustrative examples of the vinyl ether include methyl vinyl ether, ethyl vinyl ether, n-propyl vinyl ether, isopropyl vinyl ether, n-butyl vinyl ether, isobutyl vinyl ether, t-butyl vinyl ether, isoamyl vinyl ether, n-hexyl vinyl ether, n-octyl vinyl ether, 2-ethylhexyl vinyl ether, n-decyl vinyl ether, 2,2-dimethylhexyl vinyl ether, 2,2-dimethyloctyl vinyl ether, 2,2-dimethyldecyl vinyl ether, 2,2-dimethyldodecyl vinyl ether, 2,2-dimethyltetradecyl vinyl ether, sec-butyl vinyl ether, n-amyl vinyl ether, 1-methyl-2-methylpropyl vinyl ether, 1-methyl-2,2-dimethylpropyl vinyl ether, 2-ethylbutyl vinyl ether, diisopropylmethyl vinyl ether, 1,3-dimethylbutyl vinyl ether, 2,2-dimethylbutyl vinyl ether, neopentyl vinyl ether, 1-methylheptyl vinyl ether, n-nonyl vinyl ether, 1-methyl-4-ethyloctyl vinyl ether, n-tetradecyl vinyl ether, n-hexadecyl vinyl ether, n-octadecyl vinyl ether, n-dodecyl vinyl ether, n-heptadecyl vinyl ether, n-tridecyl vinyl ether, n-pentyl vinyl ether and the like.

The above compounds may be used alone or in combination of two or more.

Illustrative examples of the ethylene derivative having a halogen atom or cyano group include monomers represented by the following formula:

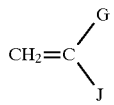

wherein either one or both of G and J are a fluorine, chlorine, bromine, or iodine atom or —C≡N group, and the other is a hydrogen atom or a methyl group.

Specifically, such monomers are acrylonitrile, methacrylonitrile, vinyl chloride, vinylidene chloride, vinylidene fluoride and the like.

The above compounds may be used alone or in combination of two or more.

Illustrative examples of the polyfunctional monomer (b-4) are monomers having two or more polymerizable double bonds per molecule and the same as those provided for the crosslinking monomer in connection with the rubber latex [B-1'].

In the monomer or the monomer mixture used in graft polymerization, the acrylate or methacrylate monomer having an alicyclic skeleton can be contained in an amount of 20 to 100% by weight, the monovinyl aromatic monomer (b-2) in an amount of 0 to 70% by weight, preferably 0 to 55% by weight, the other monovinyl monomer (b-3) copolymerizable with these monomers in an amount of 0 to 70% by weight, preferably 0 to 50% by weight, and the[]'-, polyfunctional monomer (b-4) in an amount of 0 to 3% by weight, preferably 0 to 2% by weight.

As a graft polymerization method, an emulsion method, for example, can be suitably used in which the monomer or the monomer mixture [B-2'], and a polymerization initiator are added to an aqueous dispersion of the styrene-butadiene copolymer type rubber latex [B-1'].

The aqueous dispersion of the styrene-butadiene copolymer type rubber latex [B-1']can be obtained by a method disclosed in JP-A-51-62890, for example.

In the graft polymerization, a persulfate or organic peroxide is preferably used as a polymerization initiator. Specific examples of the polymerization initiator include ammonium persulfate, potassium persulfate, benzoyl peroxide-dimethylaniline and the like.

A surfactant is preferably used to stabilize reaction system, with illustrative examples thereof including potassium lauryl sulfate, sodium dodecylbenzene sulfate, sodium oleate and the like.

The reaction temperature can be suitably selected from the range of 0° to 150° C. To control the length of a graft chain as required, a chain transfer agent may be added to polymerization system. Illustrative examples of the chain transfer agent include thiols such as tert-butyl mercaptan, n-butyl mercaptan, n-octyl mercaptan, n-dodecyl mercaptan, lauryl mercaptan and p-toluene thiol; hydrocarbon halides such as carbon tetrabromide; acroleins such as acrolein oxime; metal halides such as ferric chloride and copper chloride; organic metals such as zinc diethyl; and the like.

A description is subsequently given of the second production process for producing the core-shell elastomer.

By the second production process is prepared a core-shell elastomer (to be referred to as "core-shell elastomer [E]" hereinafter) which contains [B-1] 40 to 85 parts by weight of a core component which comprises styrene-butadiene copolymer type rubber containing 50% or less by weight of styrene unit and [B-2''] 15 to 60 parts by weight of a shell component which comprises a copolymer having a unit derived from a monomer mixture of (b-2) 20 to 80% by weight of a monovinyl aromatic monomer, (b-3) 20 to 80% by weight of other monoviyl monomer copolymerizable with these monomers, and (b-4) 0 to 3% by weight of a polyfunctional monomer. In this elastomer powders, the total of the core component and the shell component is 100 parts by weight.

The above core-shell elastomer [E] can be produced by emulsion polymerizing the monomer mixture of (b-2), (b-3) and (b-4) described above with styrene-butadiene copolymer type rubber particles as a seed in accordance with a conventional seed polymerization method.

As the styrene-butadiene copolymer type rubber containing 50% or less by weight of styrene unit, those having the same composition as the rubber latex [B-1'] illustrated in the first production process may be used.

Examples of the monovinyl monomer (b-2), the other monovinyl monomer (b-3) copolymerizable with these monomers and the polyfunctional monomer (b-4) are the same as those provided for the first production process.

In the monomer mixture constituting the shell component, the monovinyl aromatic monomer (b-2) is contained in an amount of 20 to 80% by weight, preferably 30 to 70% by weight, the other monovinyl monomer in an amount of 20 to 80% by weight, preferably 30 to 70% by weight, and the polyfunctional monomer in an amount of 0 to 3% by weight, preferably 0 to 2% by weight.

In the second production process, [B-2'''] 5 to 100 parts by weight, preferably 7 to 50 parts by weight, of at least one acrylate or methacrylate monomer having an alicyclic skeleton and selected from the group consisting of compounds represented by the above formulas [III], [IV] and [V] is graft polymerized.

Examples of the compounds represented by the above formulas [III], [IV] and [V] are the same as those provided for the first production process. Graft polymerization may be carried out in the same manner as in the first production process.

Thus, according to the present invention, a core-shell elastomer used in the present invention is provided by the above production process.

This core-shell elastomer has an average primary particle diameter in the range of 100 to 300 nm, preferably 150 to 250 nm.

The refractive index (nD)of the core-shell elastomer is preferably in the range of 1.52 to 1.56, more preferably 1.525 to 1.555.

A description is subsequently given of the other component [A] constituting the first polymer composition of the present invention.

The cyclic olefin polymer is a polymer specified by the following [A-1], [A-2] and [A-3].

In other words, the polymer is a cyclic structure-containing polymer which is selected from the group consisting of:

[A-1] a cyclic olefin random copolymer obtained by copolymerizing (i) at least one α-olefin having 2 or more carbon atoms with (ii) at least one cyclic olefin represented by the above formula [I] or [II];

[A-2] at least one cyclic olefin ring-opening polymer represented by the above formula [I] or [II]; and

[A-3] a hydrogenated, ring-opening polymer of at least one cyclic olefin represented by the above formula [I] or [II]; and which has an intrinsic viscosity [η], measured in decalin at 135° C., of 0.05 to 5.0 dl/g, a glass transition temperature (Tg), measured by DSC, of 70° C. or more, and a refractive index $(n_D)$, measured at 25° C., of 1.500 to 1.650.

The definition of each symbol in the above formulas [I] and [II] will be understood from examples of each symbol in the above formulas [III] and [IV].

Illustrative examples of (i) the α-olefin having 2 or more carbon atoms used for the copolymerization of [A-1] the cyclic olefin random copolymer include α-olefins having 2 to 20 carbon atoms such as ethylene, propylene, 1-butene, 1-pentene, 1-hexene, 4-methyl-1-pentene, 1-octene, 1-decene, 1-dodecene, 1-tetradecene, 1-hexadecene, 1-ocotadene and 1-eicosene. They may be used alone or in combination of two or more. Among these, particularly preferred is ethylene.

Illustrative examples of the cyclic olefin represented by the above formula [I] or [II] include bicyclo-2-heptene derivatives (bicyclohepto-2-en derivatives), tricyclo-3-decene derivatives, tricyclo-3-undecene derivatives, tetracyclo-3-dodecene derivatives, pentacyclo-4-pentadecene derivatives, pentacyclopentadecadiene derivatives, pentacyclo-3-pentadecene derivatives, pentacyclo-4-hexadecene derivatives, pentacyclo-3-hexadecene derivatives, hexacyclo-4-heptadecene derivatives, heptacyclo-5-eicosene derivatives, heptacyclo-4-eicosene derivatives, heptacyclo-5-heneicosene derivatives, octacyclo-5-docosene derivatives, nonacyclo-5-pentacosene derivatives, nonacyclo-6-hexacosene derivatives, cyclopentadiene-acenaphthylene adduct, 1,4-methano-1,4,4a,9a-tetrahydrofluorene derivatives, 1,4-methano-1,4,4a,5,10,10a-hexahydroanthracene derivatives and the like.

Specific examples of the cyclic olefin represented by the above formula [I] or [II] are shown below. Bicyclo[2.2.1]hepto-2-en derivatives such as (401) bicyclo[2.2.1]hepto-2-en

(402) 6-methylbicyclo[2.2.1]hepto-2-en

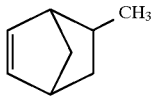

(403) 5,6-dimethylbicyclo[2.2.1]hepto-2-en

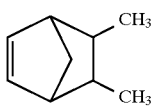

(404) 1-methylbicyclo[2.2.1]hepto-2-en

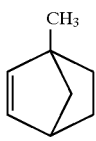

(405) 6-ethylbicyclo[2.2.1]hepto-2-en

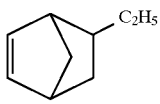

(406) 6-n-butylbicyclo[2.2.1]hepto-2-en

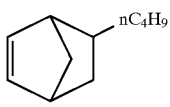

(407) 6-isobutylbicyclo[2.2.1]hepto-2-en

(408) 7-methylbicyclo[2.2.1]hepto-2-en;

tricyclo[4.3.0.1$^{2,5}$]-3-decene derivatives such as (409) tricyclo[4.3.0.1$^{2,5}$]-3-decene

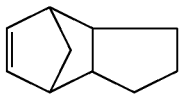

(410) 2-methyltricyclo[4.3.0.1$^{2,5}$]-3-decene

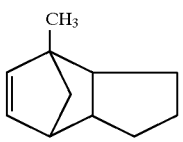

(411) 5-methyltricyclo[4.3.0.1$^{2,5}$]-3-decene;

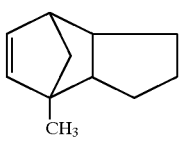

tricyclo[4.4.0.1$^{2,5}$]-3-undecene derivatives such as (412) tricyclo[4.4.0.1$^{2,5}$]-3-undecene

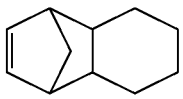

(413) 10-methyltricyclo[4.4.0.1$^{2,5}$]-3-undecene;

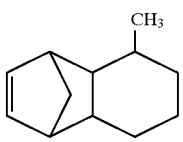

tetracyclo[4.4.0.1$^{2,5}$.1$^{7,10}$]-3-dodecene derivatives such as (414) tetracyclo[4.4.0.1$^{2,5}$.1$^{7,10}$]-3-dodecene

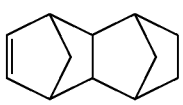

(415) 8-methyltetracyclo[4.4.0.1$^{2,5}$.1$^{7,10}$]-3-dodecene

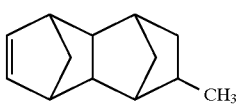

(416) 8-ethyltetracyclo[4.4.0.1$^{2,5}$.1$^{7,10}$]-3-dodecene

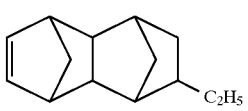

(417) 8-propyltetracyclo[4.4.0.1$^{2,5}$.1$^{7,10}$]-3-dodecene

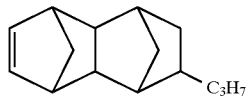

(418) 8-butyltetracyclo[4.4.0.1$^{2,5}$.1$^{7,10}$]-3-dodecene

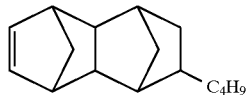

(419) 8-isobutyltetracyclo[4.4.0.1$^{2,5}$. 1$^{7,10}$]-3-dodecene

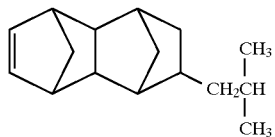

(420) 8-hexyltetracyclo[4.4.0.1$^{2,5}$.1$^{7,10}$]-3-dodecene

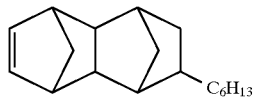

(421) 8-cyclohexyltetracyclo[4.4.0.1$^{2,5}$.1$^{7,10}$]-3-dodecene

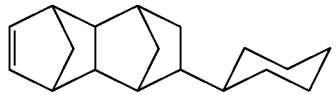

(422) 8-stearyltetracyclo[4.4.0.1$^{2,5}$.1$^{7,10}$]-3-dodecene

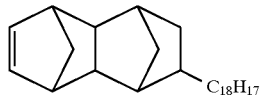

(423) 5,10-dimethyltetracyclo[4.4.0.1$^{2,5}$.1$^{7,10}$]-3-dodecene

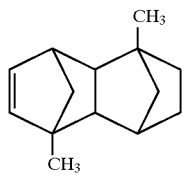

(424) 2,10-dimethyltetracyclo[4.4.0.1$^{2,5}$.1$^{7,10}$]-3-dodecene

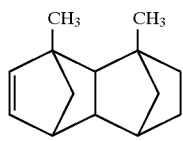

(425) 8,9-dimethyltetracyclo[4.4.0.1$^{2,5}$.1$^{7,10}$]-3-dodecene

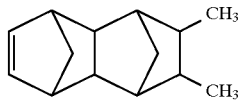

(426) 8-ethyl-9-methyltetracyclo[4.4.0.1$^{2,5}$.1$^{7,10}$]-3-dodecene

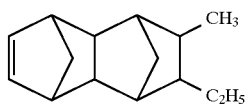

(427) 11,12-dimethyltetracyclo[4.4.0.1$^{2,5}$.1$^{7,10}$]-3-dodecene

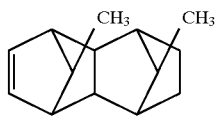

(428) 2,7,9-trimethyltetracyclo[4.4.0.1$^{2,5}$.1$^{7,10}$]-3-dodecene

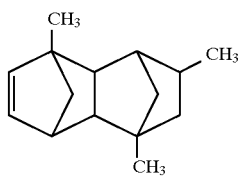

(429) 2,7-dimethyl-9-ethyltetracyclo[4.4.0.1$^{2,5}$.1$^{7,10}$]-3-dodecene

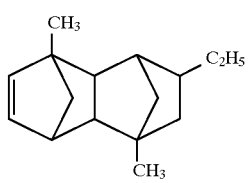

(430) 9-isobutyl-2,7-di-methyltetracyclo[4.4.0.1$^{2,5}$.1$^{7,10}$]-3-dodecene

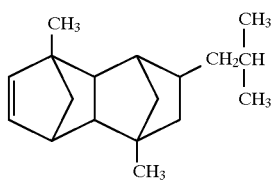

(431) 9,11,12-trimethyltetracyclo[4.4.0.1$^{2,5}$.1$^{7,10}$]-3-dodecene

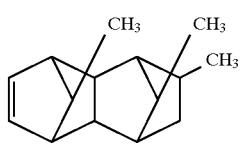

(432) 9-ethyl-11,12-dimethyltetracyclo[4.4.0.1$^{2,5}$.1$^{7,10}$]-3-dodecene

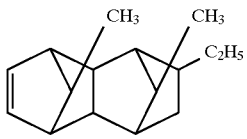

(433) 9-isobutyl-11,12-dimethyltetracyclo[4.4.0.1$^{2,5}$.1$^{7,10}$]-3-dodecene

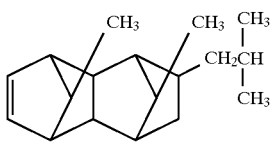

(434) 5,8,9,10-tetramethyltetracyclo[4.4.0.1$^{2,5}$.1$^{7,10}$]-3-dodecene

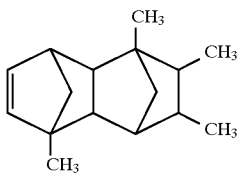

(435) 8-ethylidenetetracyclo[4.4.0.1$^{2,5}$.1$^{7,10}$]-3-dodecene

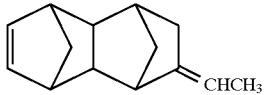

(436) 8-ethylidene-9-methyltetracyclo[4.4.0.1$^{2,5}$.1$^{7,10}$]-3-dodecene

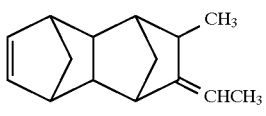

(437) 8-ethylidene-9-ethyltetracyclo[4.4.0.1$^{2,5}$.1$^{7,10}$]-3-dodecene

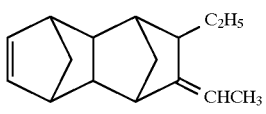

(438) 8-ethylidene-9-isopropyltetracyclo[4.4.0.1$^{2,5}$.1$^{7,10}$]-3-dodecene

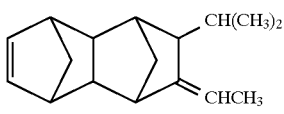

(439) 8-ethylidene-9-butyltetracyclo[4.4.0.1$^{2,5}$.1$^{7,10}$]-3-dodecene

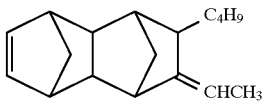

(440) 8-n-propylidenetetracyclo[4.4.0.1$^{2,5}$.1$^{7,10}$]-3-dodecene

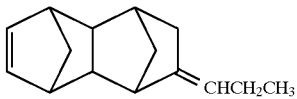

(441) 8-n-propylidene-9-methyltetracyclo[4.4.0.1$^{2,5}$.1$^{7,10}$]-3-dodecene

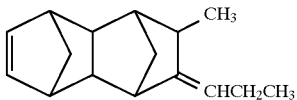

(442) 8-n-propylidene-9-ethyltetracyclo[4.4.0.1$^{2,5}$.1$^{7,10}$]-3-dodecene

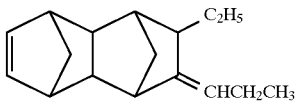

(443) 8-n-propylidene-9-isopropyltetracyclo[4.4.0.1$^{2,5}$.1$^{7,10}$]-3-dodecene

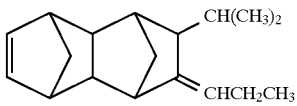

(444) 8-n-propylidene-9-butyltetracyclo[4.4.0.1$^{2,5}$.1$^{7,10}$]-3-dodecene

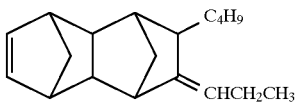

(445) 8-isopropylidenetetracyclo[4.4.0.1$^{2,5}$.1$^{7,10}$]-3-dodecene

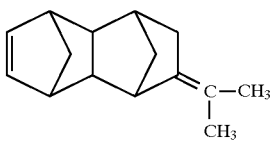

(446) 8-isopropylidene-9-methyltetracyclo[4.4.0.1$^{2,5}$.1$^{7,10}$]-3-dodecene

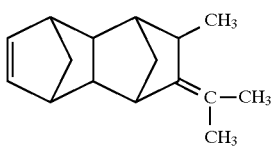

(447) 8-isopropylidene-9-ethyltetracyclo[4.4.0.1$^{2,5}$.1$^{7,10}$]-3-dodecene

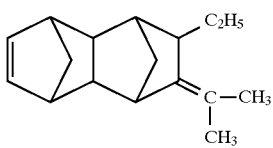

(448) 8-isopropylidene-9-isopropyltetracyclo[4.4.0.1$^{2,5}$.1$^{7,10}$]-3-dodecene

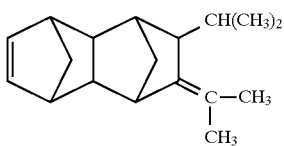

(449) 8-isopropylidene-9-butyltetracyclo[4.4.0.1$^{2,5}$.1$^{7,10}$]-3-dodecene

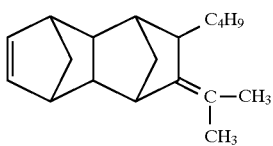

(450) 8-chlorotetracyclo[4.4.0.1$^{2,5}$.1$^{7,10}$]-3-dodecene

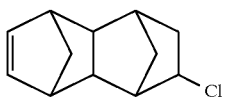

(451) 8-bromotetracyclo[4.4.0.1$^{2,5}$.1$^{7,10}$]-3-dodecene

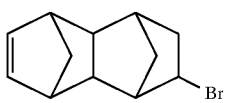

(452) 8-fluorotetracyclo[4.4.0.1$^{2,5}$.1$^{7,10}$]-3-dodecene

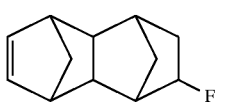

(453) 8,9-dichlorotetracyclo[4.4.0.1$^{2,5}$.1$^{7,10}$]-3-dodecene;

pentacyclo[6.5.1.1$^{3,6}$.0$^{2,7}$.0$^{9,13}$]-4-pentadecene derivatives such as (454) pentacyclo[6.5.1.1$^{3,6}$.0$^{2,7}$.0$^{9,13}$]-4-pentadecene

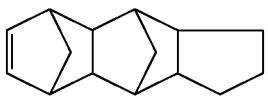

(455) 1,3-dimethylpentacyclo[6.5.1.1$^{3,6}$.0$^{2,7}$.0$^{9,13}$]-4-pentadecene

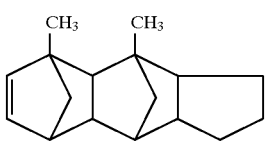

(456) 1,6-dimethylpentacyclo[6.5.1.1$^{3,6}$.0$^{2,7}$.0$^{9,13}$]-4-pentadecene

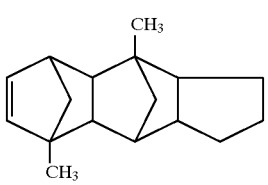

(457) 14,15-dimethylpentacyclo[6.5.1.1$^{3,6}$.0$^{2,7}$.0$^{9,13}$]-4-pentadecene;

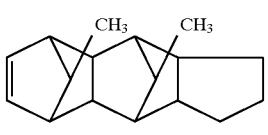

pentacyclo[7.4.0.1$^{2,5}$.1$^{9,12}$.0$^{8,13}$]-3-pentadecene derivatives such as (458) pentacyclo[7.4.0.1$^{2,5}$.1$^{9,12}$.0$^{8,13}$]-3-pentadecene

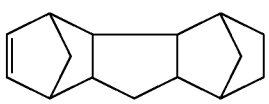

(459) methyl-substituted pentacyclo[7.4.0.1$^{2,5}$.1$^{9,12}$.0$^{8,13}$]-3-pentadecene;

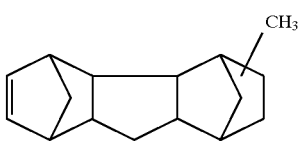

pentacyclopentadecadiene compounds such as (460) pentacyclo[6.5.1.1$^{3,6}$.0$^{2,7}$.0$^{9,13}$]-4 10-pentadecadiene;

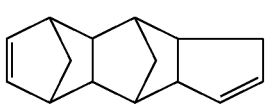

pentacyclo[8.4.0.1$^{2,5}$.1$^{9,12}$.0$^{8,13}$]-3-hexadecene derivatives such as (461) pentacyclo[8.4.0.1$^{2,5}$.1$^{9,12}$.0$^{8,13}$]-3-hexadecene

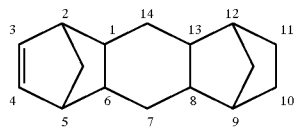

(462) 11-methyl-pentacyclo[8.4.0.1$^{2,5}$.1$^{9,12}$.0$^{8,13}$]-3-hexadecene

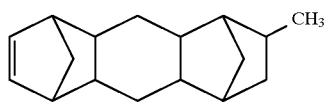

(463) 11-ethyl-pentacyclo[8.4.0.1$^{2,5}$.1$^{9,12}$.0$^{8,13}$]-3-hexadecene

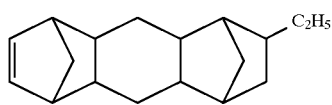

(464) 10,11-dimethyl-pentacyclo[8.4.0.1$^{2,5}$.1$^{9,12}$.0$^{8,13}$]-3-hexadecene;

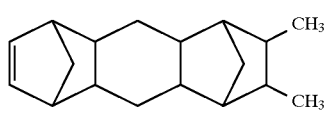

pentacyclo[6.6.1.1$^{3,6}$.0$^{2,7}$.0$^{9,14}$]-4-hexadecene derivatives such as (465) pentacyclo[6.6.1.1$^{3,6}$.0$^{2,7}$.0$^{9,14}$]-4-hexadecene

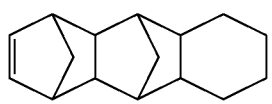

(466) 1,3-dimethylpentacyclo[6.6.1.1$^{3,6}$.0$^{2,7}$.0$^{9,14}$]-4-hexadecene

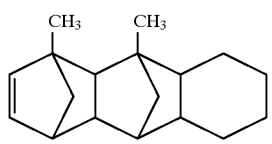

(467) 1,6-dimethylpentacyclo[6.6.1.1$^{3,6}$.0$^{2,7}$.0$^{9,14}$)-4-hexadecene

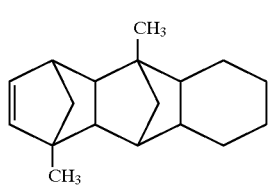

(468) 15,16-direthylpentacyclo[6.6.1.1$^{3,6}$.0$^{2,7}$.0$^{9,14}$]-4-hexadecene;

hexacyclo[6.6.1.1$^{3,6}$.1$^{10,13}$.0$^{2,7}$.0$^{9,14}$]-4-heptadecene derivatives such as (469) hexacyclo[6.6.1.1$^{3,6}$.1$^{10,13}$.0$^{2,7}$.0$^{9,14}$]-4-heptadecene

(470) 12-methylhexacyclo[6.6.1.1$^{3,6}$.1$^{10,13}$.0$^{2,7}$.0$^{9,14}$]-4-heptadecene

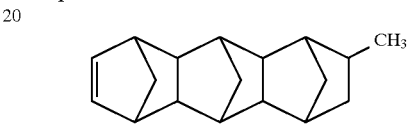

(471) 12-ethylhexacyclo[6.6.1.1$^{3,6}$.1$^{10,13}$.0$^{2,7}$.0$^{9,14}$]-4-heptadecene

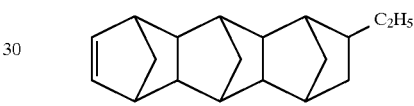

(472) 12-isobutylhexacyclo[6.6.1.1$^{3,6}$.1$^{10,13}$.0$^{2,7}$.0$^{9,14}$]-4-heptadecene

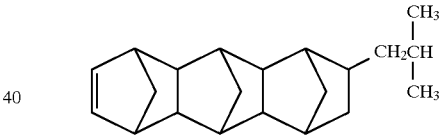

(473) 1,6,10-trimethyl-12-isobutylhexacyclo[6.6.1.1$^{3,6}$.1$^{10,13}$.0$^{2,7}$.0$^{9,14}$]-4-heptadecene;

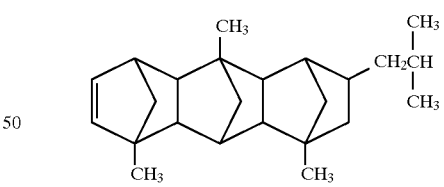

heptacyclo-5-eicosene derivatives such as
(474) heptacyclo[8.7.0.1$^{2,9}$.1$^{4,7}$.1$^{11,17}$.0$^{3,8}$.0$^{12,16}$]-5-eicosene;

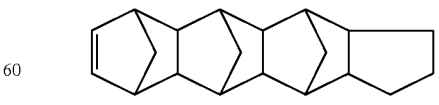

heptacyclo[8.7.0.1$^{3,6}$.1$^{10,17}$.1$^{12,15}$.0$^{2,7}$.0$^{11,16}$]-4-eicosene derivatives such as (475) heptacyclo[8.7.0.1$^{3,6}$.1$^{10,17}$.1$^{12,15}$.0$^{2,7}$.0$^{11,16}$]-4-eicosene

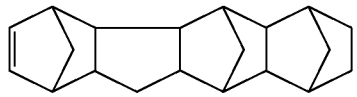

(476) dimethyl-substituted heptacyclo[8.7.0.1$^{3,6}$.1$^{10,17}$.1$^{12,15}$.0$^{2,7}$.0$^{11,16}$])-4-eicosene;

heptacyclo-5-heneicosene derivatives such as (477) heptacyclo[8.8.0.1$^{2,9}$.1$^{.4,7}$.1$^{11,18}$.0$^{3,8}$.0$^{12,17}$]-5-heneicosene (478) heptacyclo[8.8.0.1$^{4,7}$.1$^{11,18}$.1$^{13,16}$.0$^{3,8}$.0$^{12,17}$)-5-heneicosene

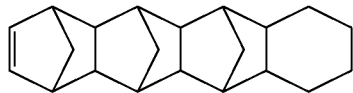

(479) 15-methyl-heptacyclo[8.8.0.1$^{4,7}$.1$^{11,18}$.1$^{13,16}$.0$^{3,8}$.0$^{12,17}$]-5-heneicosene

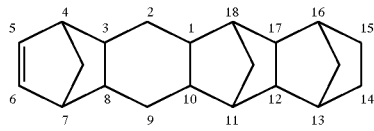

(480) trimethyl-substituted heptacyclo[8.8.0.1$^{4,7}$.1$^{11,18}$.1$^{13,16}$.0$^{3,8}$.0$^{12,17}$ ]-5 heneicosene;

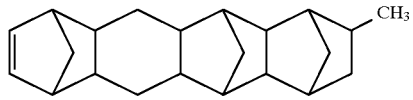

octacyclo[8.8.0.1$^{2,9}$.1$^{4,7}$.1$^{11,18}$.1$^{13,16}$.0$^{3,8}$.0$^{12,17}$ ]-5-docosene derivatives such as (481) octacyclo[8.8.0.1$^{2,9}$.1$^{4,7}$.1$^{11,18}$.1$^{13,16}$.0$^{3,8}$.0$^{12,17}$]-5-docosene

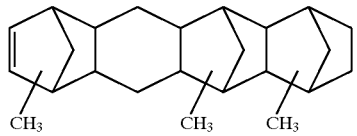

(482) 15-methyloctacyclo[8.8.0.1$^{2,9}$.1$^{4,7}$.1$^{11,18}$.1$^{13,16}$.0$^{3,8}$.0$^{12,17}$]-5-docosene

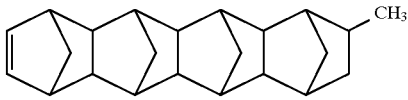

(483) 15-ethyloctacyclo[8.8.0.1$^{2,9}$.1$^{4,7}$.1$^{11,18}$.1$^{13,16}$.0$^{3,8}$.0$^{12,17}$]-5-docosene;

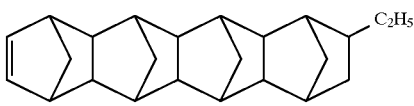

nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene derivatives such as (484) nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene

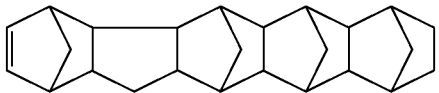

(485) trimethyl-substituted nonacyclo[10.9.1$^{4,7}$.1$^{13,20}$.1$^{15,18}$.0$^{2,10}$.0$^{3,8}$.0$^{12,21}$.0$^{14,19}$]-5-pentacosene;

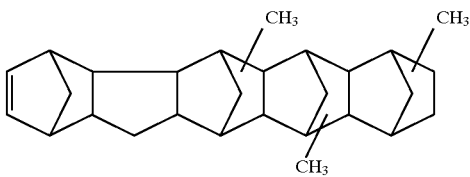

nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as (486) nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene;

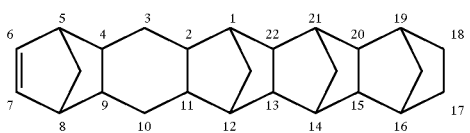

(487) 5-phenyl-bicyclo[2.2.1]hepto-2-en;

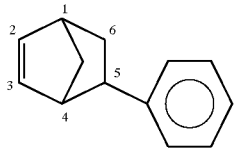

(488) 5-methyl-5-phenyl-bicyclo[2.2.1]hepto-2-en;

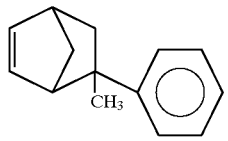

(489) 5-benzyl-bicyclo[2.2.1]hepto-2-en;

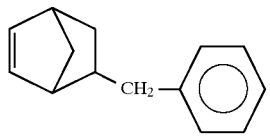

(490) 5-tolyl-bicyclo[2.2.1]hepto-2-en;

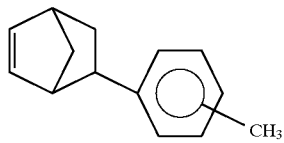

(491) 5-(ethylphenyl)-bicyclo[2.2.1]hepto-2-en;

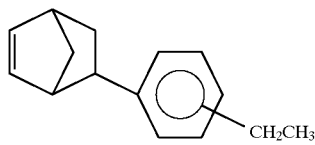

(492) 5-(isopropylphenyl)-bicyclo[2.2.1]hepto-2-en;

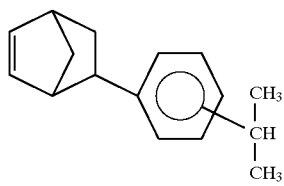

(493) 5-(biphenyl)-bicyclo[2.2.1]hepto-2-en;

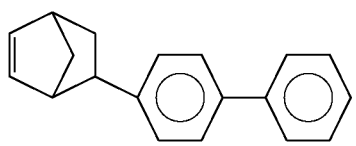

(494) 5-(β-naphthyl)-bicyclo[2.2.1]hepto-2-en;

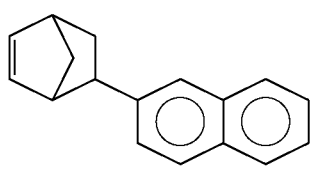

(495) 5-(α-naphthyl)-bicyclo[2.2.1]hepto-2-en;

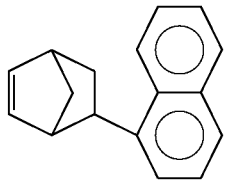

(496) 5-(anthracenyl)-bicyclo[2.2.1]hepto-2-en;

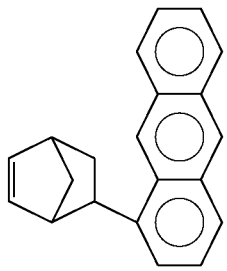

(497) 5,6-diphenyl-bicyclo[2.2.1]hepto-2-en;

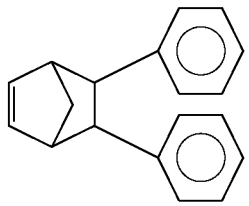

(498) cyclopentadiene-acenaphthylene adduct;

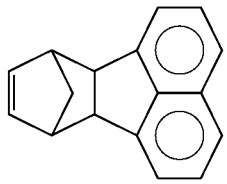

(499) 1,4-methano-1,4,4a,9a-tetrahydrofluorene;

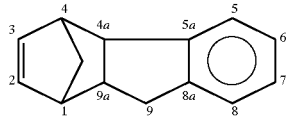

(500) 1,4-methano-1,4,4a,5,10,10a-hexahydroanthracene;

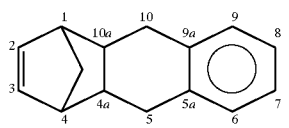

(501) 8-phenyl-tetracyclo[4.4.0.1$^{2,5}$.1$^{7,10}$]-3-dodecene;

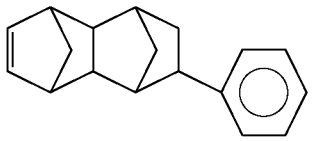

(502) 8-methyl-8-phenyl-tetracyclo[4.4.0.1$^{2,5}$.1$^{7,10}$]-3-dodecene;

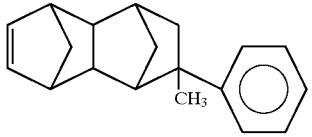

(503) 8-benzyl-tetracyclo[4.4.0.1$^{2,5}$.1$^{7,10}$]-3-dodecene;

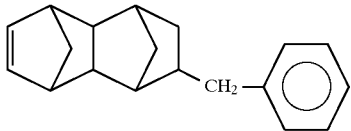

(504) 8-tolyl-tetracyclo[4.4.0.1$^{2,5}$.1$^{7,10}$]-3-dodecene;

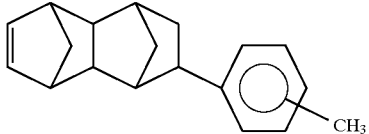

(505) 8-(ethylphenyl)-tetracyclo[4.4.0.1$^{2,5}$.1$^{7,10}$]-3-dodecene;

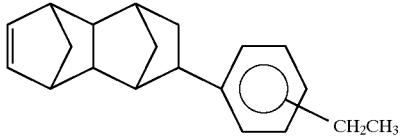

(506) 8-(isopropylphenyl)-tetracyclo[4.4.0.1$^{2,5}$.1$^{7,10}$]-3-dodecene;

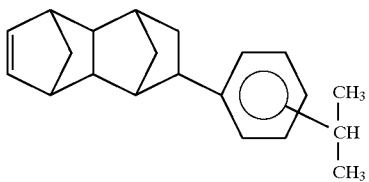

(507) 8,9-diphenyl-tetracyclo[4.4.0.1$^{2,5}$.1$^{7,10}$]-3-dodecene;

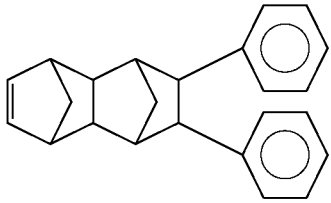

(508) 8-(biphenyl)-tetracyclo[4.4.0.1$^{2,5}$.1$^{7,10}$]-3-dodecene;

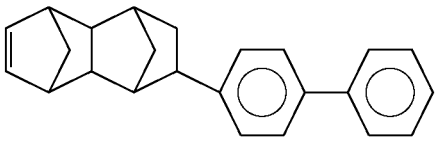

(509) 8-(β-naphthyl)-tetracyclo[4.4.0.1$^{2,5}$.1$^{7,10}$]-3-dodecene;

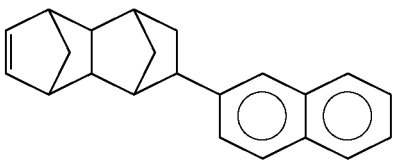

(510) 8-(α-naphthyl)-tetracyclo[4.4.0.1$^{2,5}$.1$^{7,10}$]-3-dodecene;

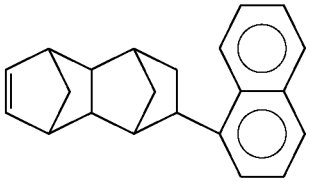

(511) 8-(anthracenyl)-tetracyclo[4.4.0.1$^{2,5}$.1$^{7,10}$]-3-dodecene;

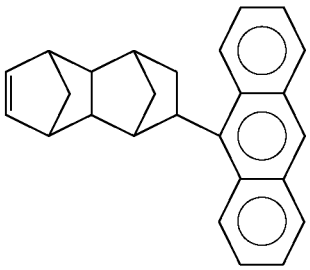

(512) compound obtained by further adding cyclopentadiene to cyclopentadiene-acenaphthylene adduct;

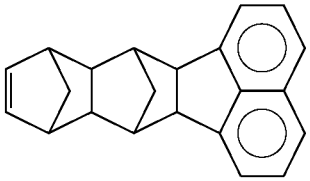

(513) 11,12-benzo-pentacyclo[6.5.1.1$^{3,6}$.0$^{2,7}$.0$^{9,13}$]-4-pentadecene;

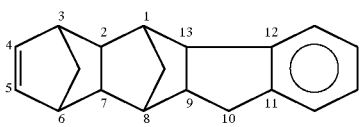

(514) 11,12-benzo-pentacyclo[6.6.1.1$^{3,6}$.0$^{2,7}$.0$^{9,14}$]-4-hexadecene;

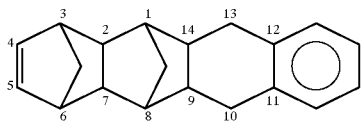

(515) 11-phenyl-hexacyclo[6.6.1.1$^{3,6}$.1$^{10,13}$.0$^{2,7}$.0$^{9,14}$]-4-heptadecene,

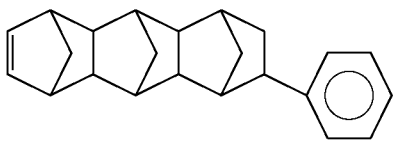

(516) 14,15-benzo-heptacyclo[8.7.0.1$^{2,9}$.1$^{4,7}$.1$^{11,17}$.0$^{3,8}$.0$^{12,16}$]-5-eicosene.

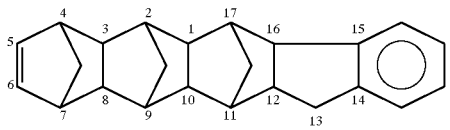

The cyclic olefins represented by the above formula [I] or [II] can be produced by subjecting cyclopentadiene and an olefin having a corresponding structure to a Diels-Alder reaction.

Structural units derived from cyclic olefins represented by the above formula [I] or [II] are considered to form structural recurring units represented by the following formula [I'] or [II'] in the copolymer from a cyclic olefin and an α-olefin.

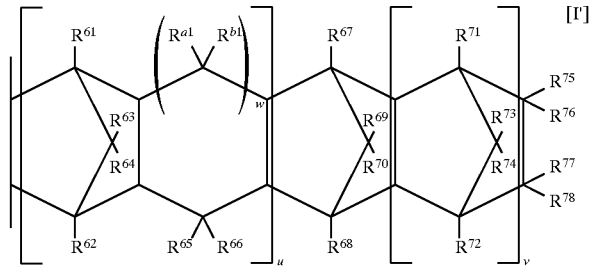

In the above formula [I'], u, v, w, R$^{61}$ to R$^{78}$, and R$^{a1}$ and R$^{b1}$ are defined as in the above formula [I].

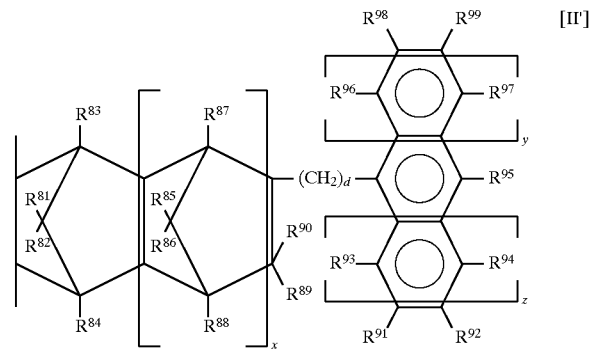

In the above formula [II'], y, z, x, d, and R$^{81}$ to R$^{99}$ are defined in the above formula [II].

These cyclic olefins may be used alone or in combination of two or more.

The cyclic olefin random copolymer [A-1] used in the first polymer composition can be produced by copolymerizing (i) at least one α-olefin having 2 or more carbon atoms with (ii) at least one cyclic olefin represented by the above formula [I] or [II] as described above in the presence of (a) a catalyst formed from a soluble vanadium compound and an organic aluminum compound (A) to be described later, or (b) a catalyst prepared from a compound of metallocene which is a transition metal selected from the group IVB of the Periodic Table or lanthanoids, and an organic aluminium oxy compound and further an organic aluminum compound (B) as required.

The soluble vanadium compound forming the catalyst (a) is specifically represented by the following general formula:

In the formulas, R is a hydrocarbon group, and a, b, c and d satisfy $0 \leq a \leq 3$, $0 \leq b \leq 3$, $2 \leq a+b \leq 3$, $0 \leq c \leq 4$, $0 \leq d \leq 4$, and $3 \leq c+d \leq 4$.

More specifically, vanadium compounds represented by the following formulas may be used as the soluble vanadium compound.

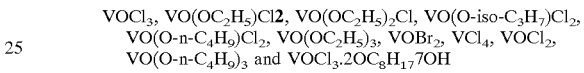

These compounds may be used alone or in combination of two or more.

The above soluble vanadium compound may be used as an electron donor additive which can be obtained by bring it into contact with an electron donor as shown below. Illustrative examples of such an electron donor include oxygen-containing electron donors such as alcohols, phenols, ketones, aldehydes, carboxylates, organic halides, organic and inorganic esters, ethers, diethers, acid amides, acid anhydrides and alkoxysilanes; and nitrogen-containing electron donors such as ammonias, amines, nitriles, pyridines and isocyanates.

More specifically, they include alcohols having 1 to 18 carbon atoms such as methanol, ethanol, propanol, butanol, pentanol, hexanol, 2-ethyl hexanol, octanol, dodecanol, octadecyl alcohol, oleyl alcohol, benzyl alcohol, phenylethyl alcohol, cumyl alcohol, isopropyl alcohol and isopropylbenzyl alcohol, and halogen-containing alcohols having 1 to 18 carbon atoms such as trichloromethanol, trichloroethanol and trichlorohexanol; phenols having 6 to 20 carbon atoms which may have a lower alkyl group, such as phenol, cresol, xylenol, ethylphenol, propylphenol, nonylphenol, cumylphenol and naphthol; ketones having 3 to 15 carbon atoms, such as acetone, methyl ethyl ketone, methyl isobutyl ketone, acetophenone, benzophenone, and benzoquinone; aldehydes having 2 to 15 carbon atoms, such as acetaldehyde, propionaldehyde, octylaldehyde, benzaldehyde, tolualdehyde and naphthoaldehyde; organic esters having 2 to 18 carbon atoms, such as methyl formate, methyl acetate, ethyl acetate, vinyl acetate, propyl acetate, octyl acetate, cyclohexyl acetate, ethyl propionate, methyl butylate, ethyl valerate, methyl chloroacetate, ethyl dichloroacetate, methyl methacrylate, ethyl crotonate, cyclohexane ethyl carboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethyl benzoate, methyl anisate, ethyl anisate, ethoxy ethyl benzoate, γ-butyrolactone, δ-valerolactone, coumarin, phthalide and ethyl carbonate; acid halides having 2 to 15 carbon atoms, such as acetyl chloride, benzoyl chloride, chloride toluylate and chloride anisate; ethers having 2 to 20 carbon atoms, such as methyl ether, ethyl ether, isopropyl ether, butyl ether, amyl ether, tetrahydrofuran, anisole and diphenyl ether; acid anhydrides such as acetic anhydride, phthalic anhydride and benzoic anhydride; alkoxysilanes such as ethyl silicate and diphenyldimethoxysilane; acid amides such as acetic acid N,N-dimethyl amide, benzoic acid N,N-diethylamide and toluic acid N,N-dimethylamide; amines such as trimethylamine, triethylamine, tributylamine, tribenzylamine and tetramethylethylenediamine; nitriles such as acetonitrile, benzonitrile and trinitrile; pyridines such as pyridine, methylpyridine, ethylpyridine and dimethylpyridine; and the like.

To prepare an electron donor additive of a soluble vanadium compound, these electron donors may be used alone or in combination of two or more.

The organic aluminum compound (A) forming the catalyst (a) together with the above soluble vanadium compound has at least one Al-C bond in the molecule and is represented by the following formulas (a) and (b).

(a) $R^1mAl(OR^2)nHpXq$ wherein $R^1$ and $R^2$ are generally a hydrocarbon group having 1 to 15 carbon atoms, preferably 1 to 4 carbon atoms, and may be the same or different, X is a halogen atom, m, n, p and q satisfy $0 \leq m \leq 3$, $0 \leq n \leq 3$, $0 \leq p < 3$ and $0 \leq q < 3$, respectively, and $m+n+P+q=3$.

(b) $M^1AlR^1$ wherein $M^1$ is Li, Na or K, and $R^1$ is as defined above.

Illustrative examples of the organic aluminum compound represented by the above formula (a) are compounds represented by the following general formulas.

$$R^1mAl(OR^2)3-m \quad (1)$$

wherein $R^1$ and $R^2$ are as defined above, and m is preferably a numeral satisfying $1.5 \leq m < 3$.

$$R^1mAlX3-m \quad (2)$$

wherein $R^1$ is as defined above, X is a halogen atom, and m is preferably a numeral satisfying $0 < m < 3$.

$$R^1mAlH3-m \quad (3)$$

wherein $R^1$ is as defined above, and m is preferably a numeral satisfying $2 \leq m < 3$.

$$R^1mAl(OR^2)nXq \quad (4)$$

wherein $R^1$ and $R^2$ are as defined above, X is a halogen atom, m, n and q satisfy $0 < m \leq 3$, $0 \leq n < 3$ and $0 \leq q < 3$, respectively, and $m+n+q=3$.

More specific examples of the organic aluminum compound (A) represented by the above general formula (a) are given below.

Specific examples of the organic aluminum compound represented by the above formula (1) include trialkyl aluminum such as triethyl aluminum and tributyl aluminum; trialkenyl aluminum such as triisopropenyl aluminum; dialkyl aluminum alkoxide such as diethyl aluminum ethoxide and dibutyl aluminum butoxide; ethyl aluminum sesquiethoxide; butyl aluminum sesquibutoxide; partly alkylated alkyl aluminum having an average composition represented by $R_1 2.5Al(OR^2)0.5$; and the like.

Specific examples of the organic aluminum compound represented by the above general formula (2) include dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partly halogenated alkyl aluminum such as ethyl aluminum dichloride, propyl aluminum dichloride and butyl aluminum dibromide; and the like.

Specific examples of the organic aluminum compound represented by the above general formula (3) include dialkyl aluminum hydrides such as diethyl aluminum hydride and dibutyl aluminum hydride; partly hydrogenated alkyl aluminum such as ethyl aluminum dihydride and propyl aluminum dihydride; and the like.

Specific examples of the organic aluminum compound represented by the above general formula (4) include partly alkoxylated and halogenated alkyl aluminum such as ethyl aluminum ethoxy chloride, butyl aluminum butoxy chloride and ethyl aluminum ethoxy bromide.

Compounds similar to the compounds represented by the above general formula (a), such as organic aluminum compounds to which two or more aluminums are bonded via an oxygen atom or nitrogen atom may be used. These compounds are represented by the following formulas.

$$(C_2H_5)_2AlOAl(C_2H_5)_2, (C_4H_9)_2AlOAl(C_4H_9)_2 \text{ and } (C_2H_5)_2AlN(C_6H_5)Al(C_2H_5)_2$$

Compounds belonging to the above formula (b) include $LiAl(C_2H_5)_4$, $LiAl(C_7H_{15})_4$ and the like.

Among these, particularly preferred are alkyl aluminum halides, alkyl aluminum dihalides and mixtures thereof.

A description is subsequently given of the catalyst (b) which is formed from a compound of metallocene which is a transition metal selected from the group IVB of the Periodic Table or lanthanoids and an organic aluminum oxy compound and further an organic aluminum compound (B) as required.

As the transition metal compound selected from the group IVB of the Periodic Table or lanthanoids and including a ligand having a cyclopentadienyl skeleton, compounds represented by the following general formula [XI] may be used.

$$MI_x \quad [XI]$$

In the above general formula [XI], M is a transition metal selected from the group IVB of the Periodic Table and lanthanoids, i.e., zirconium, titanium, hafnium, neodymium, samarium or yttrium, L is a ligand coordinated with the transition metal, at least one of L's is a ligand having a cyclopentadienyl skeleton, other L's are a hydrocarbon group having 1 to 12 carbon atoms, alkoxy group, aryloxy group, halogen atom, trialkylsilyl group, $SO_3R$ (R is a hydrocarbon group having 1 to 8 carbon atoms which may have a substituent such as halogen) or hydrogen atom, and x is a valence of the transition metal.

Illustrative examples of the ligand having a cyclopentadienyl skeleton include cyclopentadienyl group or alkyl-substituted cyclopentadienyl group such as methyl cyclopentadienyl group, dimethyl cyclopentadienyl group, trimethyl cyclopentadienyl group, tetramethyl cyclopentadienyl group, pentamethyl cyclopentadienyl group, ethyl cyclopentadienyl group, methylethyl cyclopentadienyl group, propyl cyclopentadienyl group, methylpropyl cyclopentadienyl group, butyl cyclopentadienyl group, methylbutyl cyclopentadienyl group, hexyl cyclopentadienyl group or indenyl group, 4,5,6,7-tetrahydroindenyl group, fluorenyl group and the like. These groups may be substituted with a halogen atom, a trialkylsilyl group or the like.

Among these ligands coordinated with the transition metal, particularly preferred is an alkyl-substituted cyclopentadienyl group.

When the compound represented by the above general formula [XI] include two or more groups having a cyclopentadienyl skeleton, two of the groups having a cyclopentadienyl skeleton may be bonded via an alkylene group such as ethylene and propylene, a substituted alkylene group such as isopropylidene and diphenylmethylene, a substituted silylene group such as silylene group or dimethylsilylene group, diphenylsilylene group or methylphenylsilylene group, or the like.

Illustrative examples of ligands other than the ligand having a cyclopentadienyl skeleton include:

(1) hydrocarbon group-having 1 to 12 carbon atoms including alkyl group such as methyl group, ethyl group, propyl group, isopropyl group and butyl group; cycloalkyl group such as cyclopentyl group and cyclohexyl group; aryl group such as phenyl group and tolyl group; and aralkyl group such as benzyl group and neophyl group;

(2) alkoxy group such as methoxy group, ethoxy group and butoxy group;

(3) aryloxy group such as phenoxy group;

(4) halogen such as fluorine, chlorine, bromine and iodine; and (5) ligand represented by $SO_3R$ such as p-toluene sulphonate group, methane sulphonate group and trifluoromethane sulphonate group.

The compound represented by the above general formula [XI] is represented more specifically by the following general formula [XI'] when a valence of the transition metal is 4:

$$R^1{}_a R^2{}_b R^3{}_c R^4{}_d M \qquad [XI']$$

wherein M is zirconium, titanium, hafnium, neodymium, samarium or yttrium, $R^1$ is a group having a cyclopentadienyl skeleton, $R^2$, $R^3$ and $R^4$ are independently selected from the group consisting of a group having a cyclopentadienyl skeleton, alkyl group, cycloalkyl group, aryl group, aralkyl group, alkoxy group, aryloxy group, halogen atom, trialkylsilyl group, $SO_3R$ and hydrogen atom, a is an integer of 1 or more, and a+b+c+d=4.

According to the present invention, a transition metal compound wherein one of $R^2$, $R^3$ and $R^4$ is a group having a cyclopentadienyl skeleton, for example, a transition metal compound wherein $R^1$ and $R^2$ are each a group having a cyclopentadienyl skeleton in the above general formula [XI'], is preferably used. These groups having a cyclopentadienyl skeleton may be bonded via an alkylene group such as propylene, an alkylidene group such as isopropylidene, a substituted alkylene group such as diphenyl methylene, a silylene group or a substituted silylene group such as dimethylsilylene, diphenylsilylene or methylphenylsilylene. $R^3$ and $R^4$ are selected from the group consisting of a group having a cyclopentadienyl skeleton, alkyl group, a cycloalkyl group, an aryl group, an aralkyl group, an alkoxy group, an aryloxy group, a halogen atom, a trialkylsilyl group, a group of $SO_3R$ and a hydrogen atom.

Illustrative examples of the transition metal compound wherein M is zirconium include bis(indenyl)zirconium dichloride, bis(indenyl)zirconium dibromide, bis(indenyl) zirconium bis(p-toluene sulphonate), bis (4,5,6,7-tetrahydroindenyl)zirconium dichloride, bis(fluorenyl) zirconium dichloride, ethylene bis(indenyl)zirconium dichloride, ethylene bis(indenyl)zirconium dibromide, ethylene bis(indenyl)dimethyl zirconium, ethylene bis(indenyl) diphenyl zirconium, ethylene bis(indenyl)methyl zirconium monochloride, ethylene bis(indenyl)zirconium bis(methane sulphonate), ethylene bis(indenyl)zirconium bis(p-toluene sulphonate), ethylene bis(indenyl)zirconium bis (trifluoromethane sulphonate), ethylene bis(4,5,6,7-tetrahydroindenyl)zirconium dichloride, isopropylidene (cyclopentadienyl-fluorenyl)zirconium dichloride, isopropylidene(methylcyclopentadienyl-fluorenyl) zirconium dichloride, isopropylidene(cyclopentadienyl-indenyl)zirconium dichloride, isopropylidene (cyclopentadienyl-methylcyclopentadienyl)zirconium dichloride, isopropylidene(cyclopentadienyl-fluorenyl) dimethyl zirconium, dimethylsilylene bis(cyclopentadienyl) zirconium dichloride, dimethylsilylene bis (methylcyclopentadienyl)zirconium dichloride, dimethylsilylene bis(dimethylcyclopentadienyl)zirconium dichloride, dimethylsilylene bis(trimethylcyclopentadienyl) zirconium dichloride, dimethylsilylene bis(indenyl) zirconium dichloride, dimethylsilylene bis(indenyl) zirconium bis(trifluoromethane sulphonate), dimethylsilylene bis(4,5,6,7-tetrahydroindenyl)zirconium dichloride, dimethylsilylene(cyclopentadienyl-fluorenyl) zirconium dichloride, diphenylsilylene bis(indenyl) zirconium dichloride, ethylphenylsilylene bis(indenyl) zirconium dichloride, is(cyclopentadienyl)zirconium dichloride, bis(cyclopentadienyl)zirconium dibromide, bis (cyclopentadienyl)methylzirconium monochloride, bis (cyclopentadienyl)ethylzirconium monochloride, bis (cyclopentadienyl)cyclohexylzirconium monochloride, bis (cyclopentadienyl)phenylzirconium monochloride, bis (cyclopentadienyl)benzylzirconium monochloride, bis (cyclopentadienyl),zirconium monochloride monohydride, cyclopentadienyl)methyl zirconium monohydride, bis (cyclopentadienyl)dimethyl zirconium, bis (cyclopentadienyl)diphenyl zirconium, bis (cyclopentadienyl)dibenzyl zirconium, bis (cyclopentadienyl)zirconium methoxy chloride, bis (cyclopentadienyl)zirconium ethoxy chloride, bis (cyclopentadienyl)zirconium bis(methane sulphonate), bis (cyclopentadienyl)zirconium bis(p-toluene sulphonate), bis (cyclopentadienyl)zirconium bis(trifluoromethane sulphonate), bis(methylcyclopentadienyl)zirconium dichloride, bis(dimethylcyclopentadienyl)zirconium dichloride, bis(dimethylcyclopentadienyl)zirconium ethoxy chloride, bis(dimethylcyclopentadienyl)zirconium bis (trifluoromethane sulphonate), bis (dimethylcyclopentadienyl)dimethyl zirconium, bis (ethylcyclopentadienyl)zirconium dichloride, bis (methylethylcyclopentadienyl)zirconium dichloride, bis (propylcyclopentadienyl)zirconium dichloride, bis (methylpropylcyclopentadienyl)zirconium dichloride, bis (butylcyclopentadienyl)zirconium dichloride, bis (methylbutylcyclopentadienyl)zirconium dichloride, bis (methylbutylcyclopentadienyl)zirconium bis(methane sulphonate), bis(trimethylcyclopentadienyl)zirconium dichloride, bis(tetramethylcyclopentadienyl)zirconium dichloride, bis(pentamethylcyclopentadienyl)zirconium dichloride, bis(hexylcyclopentadienyl)zirconium dichloride, and bis(trimethylsilylcyclopentadienyl)zirconium dichloride.

In the above examples of the transition metal compound, di-substituents of the cyclopentadienyl ring include 1,2,- and 1,3-substituents and tri-substituents include 1,2,3- and 1,2,4-substituents. An alkyl group such as propyl or butyl includes isomers such as n-, i-, sec- and tert-.

According to the present invention, a transition metal compound in which zirconium metal in the zirconium compound as described above is substituted for titanium metal, hafnium metal, neodymium metal, samarium metal or yttrium metal may be used.

The organic aluminium oxy compound forming the catalyst (b) together with the transition metal compound containing a ligand having a cyclopentadienyl skeleton and selected from the group IVB of the Periodic Table and lanthanoids as described above may be conventional alumoxane or an organic aluminum oxy compound which is insoluble in benzene.

Such conventional alumoxane is represented by the following general formula:

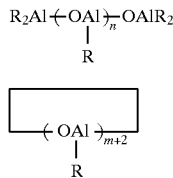

wherein R is a hydrocarbon group such as methyl group, ethyl group, propyl group or butyl group, preferably methyl group and ethyl group, particularly preferably methyl group, and each of m and n is an integer of 2 or more, preferably 5 to 40.

The alumoxane may be formed of an alkyloxy aluminum unit mixture which consists of an alkyloxy aluminum unit represented by the formula $(OAl(R^1))$ and an alkyloxy aluminum unit represented by the formula $(OAl(R^2)$ [in these formulas, $R^1$ and $R^2$ are a hydrocarbon group like R, but different from each other].

Conventional alumoxane may be prepared by the following methods, for example, and generally recovered as a solution of an aromatic hydrocarbon solvent. The methods include:

(1) a method in which an organic aluminum compound such as trialkyl aluminum is added to and reacted with an aromatic hydrocarbon solvent having suspended therein a compound containing absorbed water or a salt containing water of crystallization, such as a hydrate of magnesium chloride, copper sulfate, aluminum sulfate, nickel sulfate or cerium chloride, to recover the aluminoxan as a solution of an aromatic hydrocarbon solvent;

(2) a method in which water (water, ice or steam) is caused to directly act on an organic aluminum compound such as trialkyl aluminum in a medium such as benzene, toluene, ethyl ether or tetrahydrofuran to recover the aluminoxan as a solution of an aromatic hydrocarbon solvent; and (3) a method in which an organic aluminum compound such as trialkyl aluminum is reacted with an organic tin oxide such as dimethyl tin oxide or dibutyl tin oxide in a medium such as decane, benzene or toluene.

Among these methods, the preferred is the method (1).

Illustrative examples of the organic aluminum compound used for the preparation of an alumoxane solution include trialkyl aluminums such as trimethyl aluminum, triethyl aluminum, tripropyl aluminum, triisopropyl aluminum, tri-n-butyl aluminum, triisobutyl aluminum, tri-sec-butyl aluminum, tri-tert-butyl aluminum, tripentyl aluminum, trihexyl aluminum, trioctyl aluminum and tridecyl aluminum; tricycloalkyl aluminums such as tricyclohexyl aluminum and tricyclooctyl aluminum; dialkyl aluminum halides such as dimethyl aluminum chloride, diethyl aluminum choride, diethyl aluminum bromide and diisobutyl aluminum chloride; dialkyl aluminum hydrides such as diethyl aluminum hydride and diisobutyl aluminum hydride; alkyl aluminum alkoxides such as dimethyl aluminum methoxide and diethyl aluminum ethoxide; dialkyl aluminum aryloxides such as diethyl aluminum phenoxide; and the like.

Among these, particularly preferred are trialkyl aluminums.

As the organic aluminum compound, isoprenyl aluminum represented by the following general formula may also be used.

$(i\text{-}C_4H_9)_xAl_y(C_5H_{10})_z$ wherein x, y and z are each a positive integer and $z \geq 2x$.

The above organic aluminum compounds may be used alone or in combination of two or more.

The benzene-insoluble organic aluminum oxy compound used in the production of the component [A-1] of the present invention may be obtained by contacting a solution of alumoxane with water or an active hydrogen-containing compound or by contacting the above organic aluminum compound with water, for example.

It is desired that the benzene-insoluble organic aluminium oxy compound used in the production of the component [A-1] of the present invention should have the ratio $(D_{1260}/D_{1220})$ of absorbance $(D_{1260})$ at the neighborhood of 1,260 $cm^{-1}$ to absorbance $(D_{1220})$ at the neighborhood of 1,220 $cm^{-1'}$ measured by infrared spectroscopy (IR), of not more than 0.09, preferably not more than 0.08, particularly preferably in the range of 0.4 to 0.07.

The benzene-insoluble organic aluminum oxy compound as described above is presumed to have an alkyloxy aluminum unit represented by the following formula:

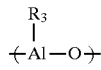

In the above formula, $R^3$ is a hydrocarbon group having 1 to 12 carbon atoms such as methyl group, ethyl group, n-propyl group, isopropyl group, n-butyl group, isobutyl group, pentyl group, hexyl group, octyl group, decyl group, cyclohexyl group or cyclooctyl group, among which methyl and ethyl groups are preferred and methyl group is particularly preferred.

In addition to the alkyloxy aluminum unit represented by the above formula, the benzene-insoluble organic aluminum oxy-compound may also contain an oxy aluminum unit represented by the following formula:

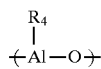

In the above formula, $R^4$ is selected from the group consisting of a hydrocarbon group having 1 to 12 carbon atoms, an alkoxy group having 1 to 12 carbon atoms, an aryloxy group having 6 to 20 carbon atoms, a hydroxyl group, a halogen atom and a hydrogen atom.

$R^4$ and $R^3$ of the above formulas are different from each other.

When the benzene-insoluble organic aluminum oxy compound contains an oxy aluminum unit, it is desired that the organic aluminum oxy compound should contain an alkyloxy aluminum unit in a proportion of at least 30 mol %, preferably at least 50 mol %, particularly preferably at least 70 mol %.

Such a benzene-insoluble organic aluminum oxy compound contains an Al component soluble in benzene heated at 60° C. in an amount of not more than 10%, preferably not more than 5%, particularly preferably not more than 2%, in terms of Al atoms, and, hence, is insoluble or difficult to be soluble in benzene.

The organic aluminum oxy compound used in the production of the component [A-1] of the present invention may contain a slight amount of an organic metal compound component other than aluminum.

As the organic aluminum compound (B) optionally used in the catalyst (b) as required, organic aluminum compounds represented by the following general formula [XII] may be used:

  [XII]

wherein $R^5$ is a hydrocarbon group having 1 to 12 carbon atoms, X a halogen atom or hydrogen atom, and n is a integer 1 to 3.

In the above general formula [XII], $R^5$ is a hydrocarbon group having 1 to 12 carbon atoms, such as alkyl group, cycloalkyl group or aryl group, more specifically methyl group, ethyl group, n-propyl group, isopropyl group, isobutyl group, pentyl group, hexyl group, octyl group, cyclopentyl group, cyclohexyl group, phenyl group, tolyl group and the like.

As the organic aluminum compound, the following compounds may be used: trialkyl aluminums such as trimethyl aluminum, triethyl aluminum, triisopropyl aluminum, triisobutyl aluminum, trioctyl aluminum and tri-2-ethylhexyl aluminum; alkenyl aluminums such as isoprenyl aluminum; dialkyl aluminum halides such as dimethyl aluminum chloride, diethyl aluminum chloride, diisopropyl aluminum chloride, diisobutyl aluminum chloride and dimethyl aluminum bromide; alkyl aluminum sesqui-halides such as methyl aluminum sesqui-chloride, ethyl aluminum sesqui-chloride, isopropyl aluminum sesqui-chloride, butyl aluminum sesqui-chloride and ethyl aluminum sesqui-bromide; alkyl aluminum dihalides such as methyl aluminum dichloride, ethyl aluminum dichloride, isopropyl aluminum dichloride and ethyl aluminum dibromide; alkyl aluminum hydrides such as diethyl aluminum hydride and diisobutyl aluminum hydride; and the like.

As the organic aluminum compound (B), compounds represented by the following general formula [XIII] may also be used:

  [XIII]

In the above formula, $R^5$ is defined as above, Y is selected from the group consisting of $—OR^6$ group, $—OSiR^7_3$ group, $—OAlR^8_2$ group, $—NR^9_2$ group, $—SiR^{10}_3$ group and $—N(R^{11})AlR^{12}_2$ group, n is 1 or 2, $R^6$, $R^7$, $R^8$ and $R^{12}$ are independently selected form the group consisting of a methyl group, an ethyl group, an isopropyl group, an isobutyl group, a cyclohexyl group and a phenyl group, $R^9$ is selected from the group consisting of a hydrogen atom, a methyl group, an ethyl group, an isopropyl group, a phenyl group and a trimethylsilyl group, and $R^{10}$ and $R^{11}$ are a methyl group or an ethyl group.

As the organic aluminum compound, the following compounds may be used: (i) compounds represented by $R^5_nAl(OR^6)_{3-n}$, such as dimethyl aluminum methoxide, diethyl aluminum ethoxide and diisobutyl aluminum methoxide; (ii) compounds represented by $R^5_nAl(OSiR^7_3)_{3-n}$, such as $Et_2Al(OSiMe_3)$, $(iso-Bu)_2Al(OSiMe_3)$ and $(iso-Bu)_2Al(OSiEt_3)$; (iii) compounds represented by $R^5_nAl(OAlR^8_2)_{3-n}$, such as $Et_2AlOAlEt_2$ and $(iso-Bu)_2AlOAl(iso-Bu)_2$; (iv) compounds represented by $R^5_nAl(NR^9_2)_{3-n}$ such as $Me_2AlNEt_2$, $Et_2AlNHMe$, $Me_2AlNHEt$, $Et_2AlN(SiMe_3)_2$ and $(iso-Bu)_2AlN(SiMe_3)_2$; (V) compounds represented by $R^5_nAl(SiR^{10}_3)_{3-n}$, such as$(iso-Bu)_2AlSiMe_3$; and (vi) compounds represented by $R^5_nAl(N(R^{11})AlR^{12}_2)_{3-n}$, such as $Et_2AlN(Me)AlEt_2$ and $(iso-Bu)_2AlN(Et)Al(iso-Bu)_2$.

Among the organic aluminum compounds represented by the above general formulas [XII] and [XIII], the preferred are organic aluminum compounds represented by the general formulas $R^5_3Al$, $R^5_nAl(OR^6)_{3-n}$ and $R^5_nAl(OAlR^8_2)_{3-n}$. What are particularly preferred are organic aluminum compounds wherein $R^5$ is an isoalkyl group and n is 2. These organic aluminum compounds may be used in admixture of two or more.

The cyclic olefin ring-opening polymer [A-2] used in the present invention is at least one cyclic olefin ring-opening polymer represented by the above formula [I] or [II].

Such a cyclic olefin ring-opening polymer can be prepared by ring-opening polymerization of cyclic olefins represented by the above formula [I] or [II] alone or in combination. In other words, a ring-open polymer can be prepared by ring-opening polymerization of at least one cyclic olefin represented by the above formula [I] or [II] in the presence of a ring-opening polymerization catalyst.

Illustrative examples of the ring-opening polymerization catalyst used herein include catalysts comprising halides of metals such as ruthenium, rhodium, osmium, indium, platinum, molybdenum and tungsten, nitrates thereof, acetyl acetone compounds thereof and reducing agents such as alcohols or tin compounds; and catalysts comprising halides of metals such as titanium, vanadium, zirconium, tungsten and molybdenum, acetyl acetone compounds thereof and metal aluminum compounds.

In the preparation of the above ring-opening polymer, a cyclic olefin other than at least one cyclic olefin represented by the above formula [I] or [II] may be used. Illustrative examples of such a cyclic olefin include monocyclic olefins having 4 or more carbon atoms such as cyclobutene, cyclopentene, cyclooctene, cyclononene, methylcyclopentene, methylcycloheptene, methylcyclooctene, methylcyclononene, methylcyclodecene, ethylcyclopentene, ethylcycloheptene, ethylcyclooctene, ethylcyclononene, dimethylcycloheptene, dimethylcyclooctene, dimethylcyclononene, dimethylcyclodecene, cyclooctadiene and cyclodecadiene; 2,3,3a,7a-tetrahydro-4,7-methano-1H-indene; 3a,5,6,7a-tetrahydro-4,7-methano-1H-indene; and the like.

Alkenes such as propylene, 1-butene, 1-pentene and 1-hexene may be used as a copolymer component of the molecular weight modifier.

In the ring-opening polymer, at least part of the cyclic olefin represented by the above formula [I] is considered to have a structure represented by the following formula [I-a]:

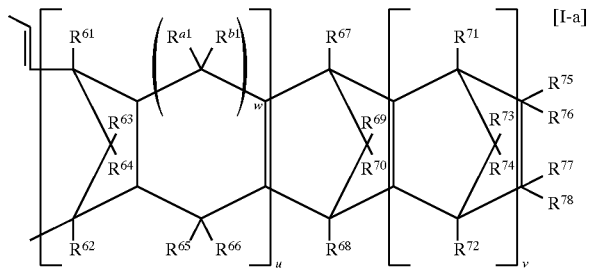

wherein u,v,w, $R^{61}$ to $R^{78}$ and $R^{a1}$ and $R^{b1}$ are the same as in the formula [I].

Also, at least part of the cyclic olefin represented by the above formula [II] is considered to have a structure represented by the following formula [II-a]:

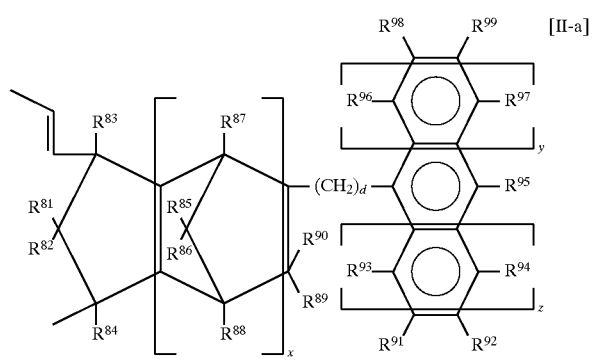

wherein x, y, z, d, $R^{81}$ to $R^{99}$ are the same as in the formula [II].

The hydrogenated, ring-opening polymer of the cyclic olefin [A-3] used in the present invention is a hydrogenated product of at least one cyclic olefin ring-opening polymer represented by the above formula [I] or [II].

The hydrogenated, ring-opening polymer of the cyclic olefin can be obtained by hydrogenating the cyclic olefin ring-opening polymer which is prepared as described above. A conventional hydrogenation process which is carried out in the presence of a hydrogenation catalyst can be used for the hydrogenation of the ring-opening polymer.

As the hydrogenation catalyst used herein, a heterogeneous catalyst which is generally used in hydrogenation of olefin compounds or a hydrogenation catalyst such as a homogeneous catalyst may be used. Illustrative examples of the heterogeneous catalyst include metals such as nickel, palladium and platinum, solid catalysts (such as nickel/silica, nickel/diatomaceous earth, palladium/carbon, palladium/silica, palladium/diatomaceous earth, and palladium/alumina) in which these metals are supported on carriers such as carbon, silica, diatomaceous earth, alumina and titanium oxide. The homogenous catalyst is a catalyst which uses a metal of group VIII of the Periodic Table, with examples thereof including organic metal compounds comprising a nickel compound or a cobalt compound such as cobalt naphtenate, triethyl aluminum, cobalt octoate/n-butyl lithium, nickel acetylacetonate/triethyl aluminum and a metal of Groups I to III of the Periodic Table. Further, a rhodium compound may be used.

A hydrogenation reaction using a hydrogenation catalyst as described above can be carried out in either one of homogenous and heterogenous systems depending on type of catalyst used. As for reaction conditions in such a system, a temperature is generally set at 0° to 180° C., preferably 20° to 100° C., at a pressure of 1 to 150 atm in a hydrogen atmosphere. Hydrogenation ratio under such conditions can be controlled by selecting conditions such as a hydrogen pressure, reaction temperature, reaction time and catalyst concentration, but generally at least 50%, preferably at least 80%, more preferably at least 95% of double bonds present in the main chain of the polymer is hydrogenated.

In such a hydrogenated cyclic polymer, at least part of the cyclic olefin represented by the above formula [I] is considered to have a structure represented by the following formula [I]-b:

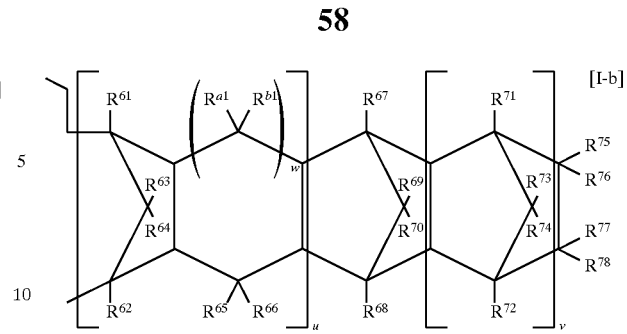

wherein u, v, w, $R^{61}$ to $R^{78}$, and $R^{a1}$ and $R^{b1}$ are the same as in the above formula [I].

Also, at least part of the cyclic olefin represented by the above formula [II] is considered to have a structure represented by the following formula [11]-b:

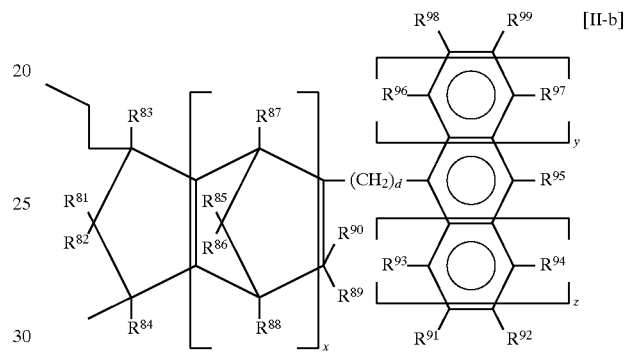

wherein x, y, z, d, and $R^{81}$ to $R^{99}$ are the same as in the above formula [II].

A detailed description is subsequently given of the cyclic structure-containing polymer [A].

It is desired that the cyclic olefin random copolymer [A-1] generally contain a recurring unit derived from an α-olefin component in an amount of 35 to 90 mol %, preferably 40 to 85 mol % and that the copolymer [A-1] generally contain a recurring unit derived from a cyclic olefin represented by the above formula [I] or [II] in an amount of 10 to 65 mol %, preferably 15 to 60 mol %.

Intrinsic viscosity [η], measured in decalin at 135° C., of the cyclic olefin random copolymer [A-1] is in the range of 0.05 to 5.01 dl/g, preferably 0.15 to 4.5 dl/g.

Glass transition temperature (Tg) measured by DSC is 70° C. or more, preferably in the range of 70° to 250° C.

Refractive index ($n_D$) measured at 25° C. is generally in the range of 1.500 to 1.650, preferably 1.510 to 1.600.

The term "refractive index" used herein is a value measured at 25° C. using an Abbe refractometer (D-ray, 589 nm).

Iodine value is preferably not more than 30.

Intrinsic viscosity [η], measured in decalin at 135° C., of the cyclic olefin ring-opening polymer [A-2] and the hydrogenated, ring-opening polymer of the cyclic olefin [A-3] is in the range of 0.05 to 5.0 dl/g, preferably 0.15 to 4.5 d;/g.

Glass transition temperature (Tg) measured by DSC is 70° C. or more, preferably in the range of 70° to 250° C.

Refractive index ($n_D$) measured at 25° C. is generally in the range of 1.500 to 1.650, preferably 1.510 to 1.600.

Iodine value is preferably not more than 30.

The cyclic structure-containing polymer may be blended with the core-shell elastomer as described above by the following methods, for example.

(1) A method in which the cyclic structure-containing polymer and the core-shell elastomer are melt blended using an extruder or a kneader.

(2) A method in which the cyclic structure-containing polymer and the core-shell elastomer are dissolved or dispersed in an appropriate solvent (such as a saturated hydrocarbon such as heptane, hexane, decane or cyclohexane or an aromatic hydrocarbon such as toluene, benzene or xylene).

The blending ratio (weight ratio) of the cyclic structure-containing polymer [A] to the core-shell elastomer [B] is 40/60 to 95/5, preferably 60/40 to 90/10 (based on 100 of the total of these two substances).

The first polymer composition of the present invention thus obtained has excellent transparency and its transparency, heat resistance and impact strength are well balanced due to the small difference of refractive index between the cyclic structure-containing polymer and the core-shell elastomer.

The cyclic structure-containing polymer and the core-shell elastomer as described above may be subjected to radical polymerization in the presence of an organic peroxide and a radical polymerizable polyfunctional monomer as required to obtain a composition.

The radical polymerization is carried out by reacting the cyclic structure-containing polymer with the core-shell elastomer in the presence of an organic peroxide and a radical polymerizable polyfunctional monomer as required.

Illustrative examples of the organic peroxide used herein include ketone peroxides such as methyl ethyl ketone peroxide and cyclohexanone peroxide; peroxy ketals such as 1,1-bis(tert-butylperoxy)cyclohexane and 2,2-bis(tert-butylperoxy)octane; hydroperoxides such as tert-butylhydroperoxide, cumenehydroperoxide, 2,5-dimethylhexane-2,5-dihydroxyperoxide and 1,1,3,3-tetramethylbutylhydroperoxide; dialkyl peroxides such as di-tert-butyl peroxide, 2,5-dimethyl-2,5-di(tert-butylperoxy) hexane and 2,5-diethyl-2,5-di(tert-butylperoxy)hexene-3; diasylperoxides such as lauroyl peroxide and benzoyl peroxide; peroxy esters such as tert-butylperoxy acetate, tert-butylperoxy benzoate and 2,5-dimethyl-2,5-di (benzoylperoxy)hexane; and the like.

Illustrative examples of the radical polymerizable polyfunctional monomer used as required include divinyl benzene, vinyl acrylate, vinyl methacrylate, triallyl isocyanurate, diallyl phthalate, ethylene dimethacrylate, trimethylolpropane trimethacrylate and the like.

When the cyclic structure-containing polymer and the core-shell elastomer are subjected to radical polymerization in the presence of an organic peroxide and a radical polymerizable polyfunctional monomer to prepare a composition, either one reactor may be used to prepare the composition or multiple reactors may be used to prepare the composition. In the latter case, the cyclic structure-containing polymer is reacted with the core-shell elastomer in each of the reactors and the resulting products are blended together to obtain the final composition.

In such radical polymerization, the organic peroxide is generally used in an amount of 0.01 to 10 parts by weight, preferably 0.05 to 5 parts by weight based on 100 parts by weight of the total of the cyclic structure-containing polymer and the core-shell elastomer. The radical polymerizable polyfunctional monomer used as required is generally used in an amount of 0.01 to 15 parts by weight, preferably 0.1 to 10 parts by weight, based on 100 parts by weight of the total of the cyclic structure-containing polymer and the core-shell elastomer.

Radical polymerization of the cyclic structure-containing polymer and the core-shell elastomer is preferably carried out at a temperature at which the organic peroxide decomposes. At the time of the reaction, all the materials may be mixed at one time, but it is preferred that both starting materials are first mixed and then blended with the organic peroxide and the radical polymerizable polyfunctional monomer as required to cause a reaction. It is desired that the organic peroxide be added when the cyclic structure-containing polymer and the core-shell elastomer are fully mixed.

To mix the cyclic structure-containing polymer and the core-shell elastomer, the following methods can be used:

(1) A method in which the cyclic structure-containing polymer and the core-shell elastomer prepared separately are melt blended using an extruder or the like.

(2) A method in which the cyclic structure-containing polymer and the core-shell elastomer are fully dissolved or dispersed in an appropriate solvent (such as a saturated hydrocarbon such as heptane, hexane, decane or cyclohexane or an aromatic hydrocarbon such as toluene, benzene or xylene).

To the resulting mixture of the cyclic structure-containing polymer and the core-shell elastomer is added an organic peroxide and a radical polymerizable polyfunctional monomer as required. The mixture is then blended to cause a reaction at a temperature at which the organic peroxide decomposes.

Such radical polymerization can be carried out when the resulting mixture of the starting materials is molten, or when the mixture is dissolved or dispersed in a solvent.

When radical polymerization is carried out in a molten state, a kneading machine such as a mixing roll, Banbury mixer, extruder, kneader or continuous mixer is used to melt mix the mixture of the starting materials in order to cause a reaction. Radical polymerization is preferably carried out for 10 seconds to 30 minutes, preferably 3 to 10 minutes at a temperature higher than a temperature at which the organic peroxide has a half value period of one minute, generally 150° to 300° C., preferably 170° to 270° C.

As the solvent used when radical polymerization is carried out with the mixture dissolved or dispersed in the solvent, a solvent similar to the solvent used in the above-described melt blending method may be used. Radical polymerization is preferably carried out at a temperature higher than a temperature at which the organic peroxide has a half-value period of 10 minutes, generally 50° to 300° C., for 10 seconds to 2 hours.

A composition is obtained from the reaction product thus obtained by removing the solvent by means of distillation, for example.

A description is subsequently given of the second polymer composition.

The description for the cyclic structure-containing polymer [A-I] constituting the first polymer composition as well as preferable aspects are directly applicable to the cyclic structure-containing polymer [A-I] constituting the second polymer composition.

Further, the core-shell elastomer [B'] which is the other component of the second polymer composition is identical to the core-shell elastomer [E] used as a starting material in the second production process of the core-shell elastomer constituting the first polymer composition. Therefore, the composition and production process as already described above as well as preferable aspects are directly applicable to the core-shell elastomer [B'] constituting the second polymer composition.

The core-shell elastomer [B'] has an average primary particle diameter in the range of 100 to 300 nm, preferably 150 to 250 nm.

The core-shell elastomer [B'] has preferably a refractive index ($n_D$) in the range of 1.52 to 1.56, more preferably 1.525 to 1.555.

A description is subsequently given of the fluid lubricant as the component [C].

Illustrative examples of the fluid lubricant used as the component [C] include petroleum resin, low-molecular weight polyolefin wax, silicone oil and the like.

Specific examples of the petroleum resin include aliphatic, alicyclic, aliphatic-alicyclic, aliphaticalicyclic-aromatic, aliphatic-aromatic, aliphatic-aromatic-polar group-based, synthetic terpene-based, alipahtic-terpene-based, terpene-phenolic, aromatic-terpene-based, styrene-based and aromatic olefin resins, aliphatic-aromatic and alicyclic saturated hydrocarbon resins, and the like.

Illustrative examples of the low-molecular weight polyolefin wax include general polymerizable polyethylene wax (high-density, low-density), modified polyethylene wax (acid value type, acid modified type, styrene modified type), thermal cracking polyolefin wax and the like.

Illustrative examples of the silicone oil include dimethyl silicone oil, methylphenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxypolyether-modified silicone oil, phenol-modified silicone oil, carboxyl-modified silicone oil, mercaptan-modified silicone oil and the like.

To blend the above components [A], [B'] and [C], the following methods may be used.

(1) A method in which these components are melt blended using an extruder or kneader.

(2) A method in which these components are blended by dissolving or dispersing in an appropriate solvent (such as a saturated hydrocarbon such as heptane, hexane, decane or cyclohexane; an aromatic hydrocarbon such as toluene, benzene or xylene; or the like).

The second polymer composition of the present invention contains the above components [A] and [B'] in a [A]/[B'] weight ratio of 40/60 to 95/5, preferably 60/40 to 90/10. The component [C] is contained in an amount of 1 to 20 parts by weight, preferably 3 to 10 parts by weight based on 100 parts by weight of the total of the components [A] and [B'].

The second polymer composition of the present invention has improved compatibility between the components [A] and [B'] and higher flowability than when the composition comprises only the components [A] and [B'] due to the presence of the component [C]. In addition, the composition is superior in transparency and impact resistance and its transparency, heat resistance and impact strength are well balanced.

Like the first polymer composition, the second polymer composition may be obtained by subjecting the above components [A], [B'] and [C] to radical polymerization in the presence of an organic peroxide and a radical polymerizable polyfunctional monomer as required.

Like the first polymer composition, the radical polymerization is carried out by reacting a cyclic olefin polymer with the core-shell elastomer powder of the present invention in the presence of the organic peroxide and the radical polymerizable polyfunctional monomer.

Types of the organic peroxide and the radical polymerizable polyfunctional monomer to be used, proportions of these substances, reaction conditions, reaction method and reactors as well as preferable aspects for the second polymer composition are the same as those for the first polymer composition.

The first and second polymer compositions thus prepared (to be simply referred to as "polymer compositions" hereinafter) are molded by conventional methods. For instance, they are extrusion molded, injection molded, blow molded and rotational-molded by a single screw extruder, vent extruder, double-screw extruder, cylindrical double-screw extruder, co-kneader, mixtruder, twin conical screw extruder, planetary screw extruder, gear extruder, screwless extruder or the like.

The polymer compositions may be blended with a rubber component to improve its impact strength, and further with additives such as a heat resistance stabilizer, weathering agent, antistatic agent, slip agent, anti-blocking agent, anti-fogging agent, lubricant, dye, pigment, natural oil, synthetic oil, wax and the like in a suitable amount.

For instance, preferred examples of the stabilizer to be blended as an optional component include phenol type anti-oxidants, sulfur atom-containing anti-oxidants, phosphor atom-containing anti-oxidants, fatty acid metal salts, fatty acid esters of polyhydric alcohol and the like.

Specific examples of the phenol type anti-oxidant include compounds represented by the following formula An-1:

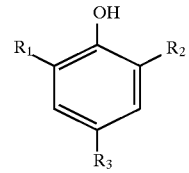

An-1 wherein $R_1$ and $R_2$ are each an alkyl group having 1 to 4 carbon atoms and a straight or side chain, $R_3$ is an alkyl group having 8 to 20 carbon atoms and a straight or side chain or a group represented by —CH$_2$—CH$_2$—COOX (X is an alkyl group having 8 to 20 carbon atoms and a straight or side chain), and compounds represented by the following formula An-2:

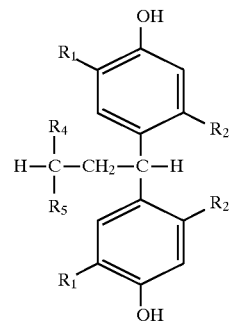

An-2 wherein $R_1$ and $R_2$ are the same as in the above formula An-1, $R_4$ and $R_5$ are independently selected from the group consisting of a hydrogen atom, alkyl group having 1 to 4 carbon atoms and compound represented by the following formula:

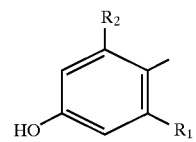

The compounds rrep esented by the above fomula An-1 include 2,6-di-t-butyl-4-nonyl phenol, 2,6-di-t-butyl-4-dodecyl phenol, 2,6-di-t-butyl-4-hexadecyl phenol, 2,6-di-t-butyl-4-octadecyl phenol, 2-t-butyl-6-isopropyl-4- octadecyl phenol, 2,6-diisopropyl-4-octadecyl phenol, 3-(4'hydroxy-3',5'-di-t-butylphenyl)propionate-n-dodecyl, 3-(4'-hydroxy-3',5'-di-t-butylphenyl)propionate-hexadecyl, 3-(4'-hdyroxy-3',5'-di-t-butylphenyl)propionate-n-octadecyl, 3-(4'-hydroxy-3'-t-butyl-5'-isopropylphenyl)propionate-n-octadecyl, 3-(4'-hydroxy-3'-t-butyl-3'-methylphenyl)propionate-n-octadecyl and the like.

The compounds represented by the above formula An-2 are commercially available and include 1,1,3-tris(2-methyl-4-hydroxy-5-t-butylphenyl)butane (registered trade name: "Topanol CA") and 4,4'-butylidene bis(6-t-butyl-m-cresol) (registered trade name: "Santowhite Powder"). "Topanol CA" is preferably used.

Other examples of the phenol type anti-oxidant include tetrakis[methylene-3(3,5-di-t-butyl-4-hydroxyphenyl)propionate]methane, β-(3,5-di-t-butl-4-hydroxyphenyl)propionate alkylester, 2,2'-oxamide-bis[ethyl-3(3,5-di-t-butyl-4-hydroxyphenyl)]propionate and the like.

Illustrative examples of the sulfur atom-containing anti-oxidant include compounds represented by the following formula An-3:

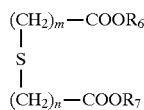

$$\begin{array}{l} (CH_2)_m-COOR_6 \\ | \\ S \\ | \\ (CH_2)_n-COOR_7 \end{array} \quad \text{An-3}$$

wherein m and n are an integer of 1 to 4, and $R_6$ and $R_7$ are an alkyl group having 8 to 20 carbon atoms and a straight or side chain.

The compounds represented by the above formula An-3 include dicaprylthiodipropionate, dilaurylthiodipropionate, dipalmitylthiodipropionate, distearylthiodipropionate and the like. Other examples of the sulfuric anti-oxidant include 4,4'-thiobis(6-t-butyl)-3-methyl phenol, 2,4-bis(n-octylthio)-6-(4-hydroxy-3,5-di-t-butylanilino)-1,3,5-triazine and the like.

Illustrative examples of the phosphor atom-containing anti-oxidant include compounds represented by the following formula An-4:

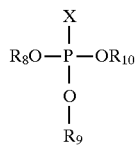

$$\begin{array}{c} X \\ | \\ R_8O-P-OR_{10} \\ | \\ O \\ | \\ R_9 \end{array} \quad \text{An-4}$$

wherein X is a hydrogen atom or lone pair of electrons, and $R_8$, $R_9$ and $R_{10}$ are independently selected from the group consisting of a hydrogen atom, alkyl group having 1 to 20 carbon atoms and mono- and di-(alkyl having 1 to 20 carbon atoms)substituted phenyl.

The phosphoric compounds represented by the above formula An-4 include phosphoric acid and tris(nonylphenyl)phosphite.

Illustrative examples of the fatty acid metal salt include zinc stearate, calcium stearate, 12-hydroxy calcium stearate and the like.

Illustrative examples of the fatty acid ester of polyhydric alcohol include glycerine monostearate, glycerine monolaurate, glycerine distearate, pentaerythritol monostearate, pentaerythritol distearate, pentaerythritol tristearate and the like.

They may be used alone or in combination, for example, combinations of tetrakis[methylene-3(3,5-di-t-butyl-4-hydroxyphenyl)propionate]methane, zinc stearate and glycerine monostearate.

A combination of a phenol type anti-oxidant and a fatty acid ester of polyhydric alcohol is particularly preferred. The fatty acid ester of polyhydric alcohol is preferably a fatty acid ester of polyhydric alcohol in which part of an alcohol hydroxyl group of polyhydric alcohol having a valence of 3 or more is esterified. Specific examples of such a fatty acid ester of polyhydric alcohol include fatty acid esters of glycerine such as glycerine monostearate, glycerine monolaurate, glycerine monomyristate, glycerine monopalmitate, glycerine distearate and glycerine dilaurate; and fatty acid esters of pentaerythritol such as pentaerythritol monostearate, pentaerythritol monolaurate, pentaerythritol dilaurate, pentaerythritol distearate and pentaerythritol tristearate. Such a phenol type anti-oxidant is used in an amount of 0 to 5 parts by weight, preferably 0 to 2 parts by weight, more preferably 0 to 1 part by weight, based on 100 parts by weight of the polymer composition. The sulfur atom-containing anti-oxidant is used in an amount of 0 to 5 parts by weight, preferably 0 to 2 parts by weight, more preferably 0 to 1 part by weight, based on 100 parts by weight of the polymer composition. The phosphor atom-containing anti-oxidant is used in an amount of 0 to 5 parts by weight, preferably 0.01 to 2 parts by weight, more preferably 0.01 to 1 part by weight, based on 100 parts by weight of the polymer composition.

The fatty acid metal salt is used in an amount of 0 to 5 parts by weight, preferably 0 to 2 parts by weight, more preferably 0 to 1 part by weight, based on 100 parts by weight of the polymer composition. The fatty acid ester of polyhydric alcohol is used in an amount of 0 to 5 parts by weight, preferably 0 to 2 parts by weight, based on 100 parts by weight of the polymer composition.

The polymer composition may be blended as required with a filler such as silica, diatomaceous earth, alumina, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, talc, clay, mica, asbestos, glass fiber, glass flake, glass bead, calcium silicate, montmorillonite, bentonite, graphite, aluminum powder, molybdenum sulfide, boron fiber, silicon carbide fiber, α-olefin fiber having 2 or more polycarbon atoms, polypropylene fiber, polyester fiber, polyamide fiber or the like.

A slight amount of the fluid lubricant [C] used in the second polymer composition may be blended with the first polymer composition.

The present invention will be described more specifically by the following examples. It should however be born in mind that the present invention is not limited to the following examples.

In the present invention, measurements of physical property values and evaluations are carried out as follows.

(A) physical property values of the core-shell elastomer
  (1) amount of a copolymer component constituting the core-shell elastomer
    Calculated from the amount charged and yield.
  (2) refractive index
    Measured at 25° C. using an Abbe refractometer (D-ray, 589 nm).
  (3) average diameter of primary particle of the core-shell elastomer
    Measured using a laser diffraction particle size distribution measuring instrument (SALD-2000, manufactured by Shimadzu Co.).

(B) physical property values of the cyclic olefin copolymer
  (1) intrinsic viscosity ([η])
    Measured in a decalin solution at 135° C. using a Ubbelohde's viscometer.
  (2) glass transition temperature (Tg)
    Measured in an $N_2$ atmosphere at a temperature elevation rate of 10° C./min. using the DSC-220C manufactured by Seiko Denshi Co.

(3) monomer composition ratio in the polymer
Measured by $^{13}$C-NMR.
(4) iodine value
Measured in accordance with JIS K3331, using iodine monochloride.
(C) measurements of physical property values and evaluation methods of the core-shell elastomer/cyclic olefin copolymer composition
(1) preparation of the composition
Predetermined amounts of the core-shell elastomer and the cyclic olefin copolymer were mixed well in a plastic bag in an nitrogen atmosphere, and substitution with nitrogen was conducted for 2 hours. The resulting mixture was melt blended by a twin screw extruder (TW100 manufactured by Haake) at the maximum cylinder temperature of 230° C. for a residence time of 1 minute and pelletized with a pelletizer.
(2) preparation of test samples
The IS50EPN injection molding machine manufactured by Toshiba Machine Co., Ltd and a predetermined mold for fabricating test samples were used to mold test samples under the following molding conditions.
The resulting test samples were measured after standing for 48 hours at room temperature.
molding conditions:
cylinder temperature: 260° C.
mold temperature: 60° C.
ratio of first/second injection pressures: 1000/800 kg/cm$^2$
(3) Haze value
A 2 mm thick press sheet sample was measured using the NDH-20D digital turbidity meter (haze meter) manufactured by Nippon Denshoku Kogyo Co. Ltd in accordance with ASTM D-1003.
(4) Izod impact strength
Measured in accordance with ASTM D256.
test sample size: (5/2)×(⅛)×(½)$^r$ inches (notched)
test temperature: 23° C.
(5) heat deformation temperature (HDT)
Carried out in accordance with ASTM D648.
test sample size: 5×(¼)×(½)$^r$ inches
load: 264 psi
Production Example 1, Examples 1 to 8 and Comparative Examples 1 to 6 to be described below are intended to explain the first polymer composition.

PRODUCTION EXAMPLE 1

[synthesis example of cyclic olefin copolymer I (to be referred to as "copolymer I" hereinafter)]

118 Grams of norbornene (sometimes to be abbreviated as NB hereinafter) was charged into an 1-liter stainless steel autoclave charged with 258 ml of cyclohexane at normal temperature in a nitrogen gas current and stirred for 5 minutes. Triisobutyl aluminum was added in such an amount that it had a concentration of 1.0 mmol/liter in the system. Subsequently, under stirring, ethylene is blown into the autoclave at normal pressure to produce an ethylene atmosphere in the autoclave system. The inside of the autoclave was maintained at 70° C. and pressurized to a gauge pressure of 6 kg/cm$^2$ with ethylene . After 10 minutes of stirring, 5.0 ml of a toluene solution containing isopropylidene (cyclopentadienyl)(indenyl)zirconium dichloride and methyl alumoxane was added to the system to start a copolymerization reaction between ethylene and NB. The concentrations of the catalysts at this time were 0.015 mmol/liter of isopropylidene(cyclopentadienyl)(indenyl) zirconium dichloride and 7.5 mmol/liter of methyl alumoxane based on the entire system.

During polymerization, temperature was maintained at 70° C. and inside pressure at a gauge pressure of 6 kg/cm$^2$ by continuously supplying ethylene into the system. After 60 minutes, the polymerization reaction was terminated by adding isopropyl alcohol. After depressurization, the polymer solution was withdrawn and brought into contact with an aqueous solution prepared by adding 5 ml of concentrated hydrochloric acid to 1 liter of water, in a proportion of 1:1 under strong agitation using a homo-mixer so that the residual catalyst was shifted to an aqueous phase. This contacted mixed solution was left to stand and then the aqueous phase was separated to remove. The mixed solution was washed with distilled water two times to purify and separate the polymer liquid phase.

Thereafter, the polymer solution purified and separated was brought into contact with three volumes of acetone under strong agitation to precipitate a copolymer. Then a solid content (copolymer) was collected by filtration and fully washed with acetone. Further, to extract unreacted NB present in the polymer, the solid content was added to acetone to have a concentration of 40 g/liter and subjected to an extraction treatment at 60° C. for 2 hours. After the extraction treatment, the solid content was collected by filtration and dried for 12 hours at 130° C. at 350 mmHg under a nitrogen gas current. The polymer yield was 36 g.

The ethylene-norbornene copolymer thus obtained (to be referred to as copolymer I) had an intrinsic viscosity [η] of 0.60 dl/g, a Tg of 148° C. and an NB content of 49.0 mol %. The iodine value of the thus obtained copolymer was 0.2. The refractive index ($n_D$) of the copolymer I was 1.532.

[synthesis example of cyclic olefin copolymer II (to be referred to as "copolymer II" hereinafter)]

Copolymerization between ethylene and tetracyclo [4.4.0.1$^{2,5}$.1$^{7,10}$]-3-dodecene (sometimes to be abbreviated as "TCD" hereinafter) was carried out continuously by the following method in the presence of a vanadium-based catalyst.

A cyclohexane solution of TCD was continuously supplied from the top of a 1-liter glass-made reactor equipped with a stirring blade so that TCD supplied had a concentration of 40 g/liter in the reactor. As catalysts, a cyclohexane solution of VO(OC$_2$H$_5$)Cl$_2$ was continuously supplied from the top of the reactor to maintain a vanadium concentration of 0.5 milli-mole/liter and a cyclohexane solution of ethyl aluminum sesquichloride (Al(C$_2$H$_5$)$_{1.5}$Cl$_{1.5}$) was continuously supplied from the top of the reactor to maintain an aluminum concentration of 4.0 milli-moles/liter in the reactor. Ethylene, nitrogen and hydrogen were fed to the polymerization system at a rate of 36.0 liters/hour, 35.0 liters/hour and 1.0 liter/hour, respectively, using a bubbling tube.

The polymerization system in which a heating medium was circulated in a jacket provided outside the reactor was maintained at 10° C. to carry out a copolymerization reaction. A solution of a copolymer produced by this copolymerization reaction was withdrawn continuously from the top of the reactor so that the amount of the polymer liquid in the reactor was always maintained at 1 liter (i.e., an average residence time was allowed to be 0.5 hour). To this withdrawn copolymer solution was added a liquid mixture of cyclohexane and isopropyl alcohol (1:1) to stop the polymerization reaction. Thereafter, a solution of 5 ml of concentrated hydrochloric acid in 1 liter of water and the polymer liquid were contacted in a proportion of 1:1 under strong agitation using a homo-mixer so that the residual catalyst was shifted to an aqueous phase. After this contacted liquid mixture was left to stand and the aqueous phase was separated to remove, the mixture was washed with distilled water two times to purify and separate the polymer liquid phase.

The polymer liquid purified and separated was then brought into contact with three volumes of acetone under strong agitation to precipitate a copolymer and then this solid content was collected by filtration and washed fully with acetone. Further, to extract unreacted TCD present in the copolymer, this solid content was added to acetone to have a concentration of 40 g/liter and subjected to an extraction treatment at 60° C. for 2 hours. After the extraction treatment, the solid content was collected by filtration and dried at 130° C. at 350 mmHg for 12 hours in a nitrogen gas current.

The ethylene-TCD copolymer thus obtained (to be referred to as "copolymer II" hereinafter) had an intrinsic viscosity [η] of 0.65 dl/g, a Tg of 82° C., a TCD content of 28.1 mol %, and an iodine value of 0.1 g (iodine)/100 g.

The copolymer II had a refractive index ($n_D$) of 1.538.

EXAMPLE 1

A description is first given of the core-shell elastomer as the component [B] of the present invention which was synthesized by the first production process.

(1) Source materials were charged into an autoclave equipped with a stirrer and fully substituted with nitrogen to achieve the following composition and stirred for 15 hours at 50° C. to effect a reaction.

| | |
|---|---|
| butadiene | 75 parts |
| styrene | 25 parts |
| polyethylene glycol dimethacrylate | 1.0 part |
| diisopropylbenzene hydroperoxide | 0.2 part |
| sodium formaldehyde sulfoxylate | 0.2 part |
| ethylene diamine tetraacetic acid (EDTA).2 sodium salt | 0.006 part |
| ferrous sulfate.7H$_2$O | 0.002 part |
| sodium pyrophosphate | 0.3 part |
| sodium oleate | 2 parts |
| ion exchange water | 200 parts |

A rubber latex having the conversion of nearly 98% and an average particle diameter of 80 nm (to be referred to as latex A hereinafter) was obtained.

(2) The thus obtained latex A and other components were charged into an autoclave equipped with a stirrer and fully substituted with nitrogen to achieve the following composition, and polymerized at 50° C. for 50 hours.

| | |
|---|---|
| Latex A (as solid content) | 8 parts |
| styrene | 23 parts |
| butadiene | 69 parts |
| diisopropylbenzene hydroperoxide | 0.1 part |
| sodium formaldehyde sulfoxylate | 0.1 part |
| EDTA.2 sodium salt | 0.004 part |
| ferrous sulfate.7H$_2$O | 0.001 part |
| sodium pyrophosphate | 0.3 part |
| sodium oleate | 0.5 part |
| ion exchange water | 150 parts |

At intervals of 10 hours after start of a reaction, 0.1 part of diisopropylbenzene hydroperoxide and 0.1 part of sodium formaldehyde sulfoxylate were added. Meanwhile, a 1% aqueous solution containing 1.5 parts of sodium oleate was continuously added over 40 hours to the mixture. The final conversion rate was almost 95% and the resulting rubber latex (to be referred to as "latex B" hereinafter) had an average particle diameter of 170 nm. When the latex B was observed through an electron microscope, there were no latex particles having a particle diameter of not more than 100 nm and not less than 300 nm.

As described above, a styrene-butadiene rubber latex (latex B) containing 25% by weight of styrene and 75% by weight of butadiene could be synthesized as a core component.

(3) Source materials were charged into a glass container while being substituted with nitrogen, and stirred at 70° C. to achieve the following composition.

| | |
|---|---|
| latex B (as solid content) | 70 parts |
| EDTA.2 sodium salt | 0.008 part |
| ferrous sulfate.7H$_2$O | 0.002 part |
| sodium formaldehyde sulfoxylate | 0.2 part |
| ion exchange water | 250 parts |

To the above mixture was added continuously a mixture comprising a monomer having the following composition and a radical initiator over 2 hours.

tetracyclododecyl acrylate (TD-A) 15 parts

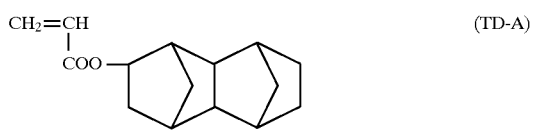

polyethylene glycol dimethacrylate 1.0 part diisopropylbenzene hydroperoxide 0.1 part When stirring was further continued for one hour after completion of addition, the conversion was 98%.

Further, a mixture having the following composition was then added continuously over 2 hours.

tetracyclododecyl acrylate (TD-A) 15 parts diisopropylbenzene hydroperoxide 0.2 part When 0.1 part of diisopropylbenzene hydroperoxide was added after completion of addition and stirred for another three hours, the conversion was 98%, and the thus obtained latex (to be referred to as "latex C" hereinafter) had an average particle diameter of 180 nm. When the latex C was observed through an electron microscope, there were no latex particles having a diameter of not more than 100 nm and not less than 300 nm.

Whether or not thickening of agglomerate took place during polymerization is confirmed by the following method. That is, when the number of particles in the latex remained unchanged, the diameter (d) of the latex particle after graft polymerization is indicated by the following equation with respect to the diameter ($d_o$) of a rubber particle:

$$d = \sqrt[3]{\frac{M}{M_o}}\ d_o$$

wherein Mo is the amount (part by weight) of the rubber charged and M=the amount of the rubber charged+the amount of a graft monomer (=100 parts).

When a rubber latex having an average particle diameter of 170 nm is used, the calculated average particle diameter of the above latex is 190 nm.

It is understood from the results of the average particle diameter calculated from the equation and the resulting average particle diameter that agglomeration hardly occurred during graft polymerization except that the outer surface of a rubber particle was covered with a graft phase and the particle grew bigger inevitably.

To the thus obtained latex C were added 1 part of 2,6-di-tertiary butyl-p-cresol (BHT) and 0.5 part of dilaurylthiodipropionate as stabilizers. After stirring fully, an aqueous solution of hydrochloric acid was added to the mixture, and the mixture was solidified, dehydrated and dried.

The composition of the thus obtained core-shell elastomer is shown in Table 1.

Further, physical property values of a composition obtained by adding 20 wt % of the core-shell elastomer to the cyclic olefin copolymer (copolymer I) are also shown in Table 1.

EXAMPLES 2 AND 3

Core-shell elastomers shown in Table 1 were synthesized using the latex B prepared as a core component in Example 1 in the same manner as in Example 1, and compositions comprising the copolymer I were prepared. In Example 2, in formation of a shell component, styrene and methyl methacrylate (MMA) were added, in addition to TD-A. Results are shown in Table 1.

EXAMPLE 4

A core-shell elastomer shown in Table 1 was synthesized using the latex B prepared in Example 1 in the same manner as in Example 1 except that norbornene acrylate (NB-A) and styrene were added in formation of a shell component, and a composition comprising the copolymer I was prepared. Results are shown in Table 1.

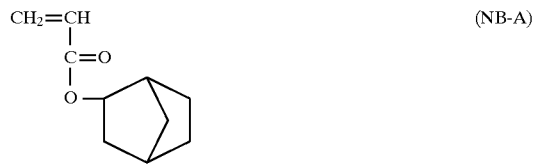

(NB-A)

EXAMPLE 5

A core-shell elastomer shown in Table 1 was synthesized using the latex B prepared in Example 1 in the same manner as in Example 1 except that cyclohexyl methacrylate (CH-MA) and styrene were added in formation of a shell component and a composition comprising the copolymer I was prepared. Results are shown in Table 1.

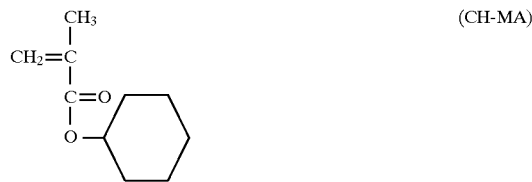

(CH-MA)

COMPARATIVE EXAMPLE 1

A core-shell elastomer was synthesized using the latex B prepared in Example 1 in the following manner.

Source materials were charged into a glass container while being substituted with nitrogen to achieve the following composition, and stirred at 70° C.

| latex B (as solid content) | 70 parts |
|---|---|
| EDTA.2 sodium salt | 0.008 part |
| ferrous sulfate.7H$_2$O | 0.002 part |
| sodium fomaldehyde sulfoxylate | 0.2 part |
| ion exchange water | 250 parts |

To the resulting mixture was added a mixture having the following composition continuously over 2 hours.

| methyl methacrylate (MMA) | 17 parts |
|---|---|
| polyethylene glycol dimethacrylate | 1.0 part |
| diisopropylbenzene hydroperoxide | 0.1 part |

When stirring was continued for 1 hour after completion of addition, the conversion was 98%. Further, the following composition was continuously added over 2 hours.

| styrene | 13 parts |
|---|---|
| diisopropylbenzene hydroperoxide | 0.2 part |

When 0.1 part of diisopropylbenzene hydroperoxide was added after completion of addition and the resulting mixture was stirred for 3 hours, the conversion was 98%, and the thus obtained latex (to be referred to as "latex D" hereinafter) had an average particle diameter of 180 nm. When the latex D was observed through an electron microscope, there were no particles having a diameter of not more than 100 nm and not less than 300 nm.

To the thus obtained latex D were added 1 part of 2,6-di-tertiary butyl-p-cresol (BHT) and 0.5 part of dilaurylthiodipropionate were added as stabilizers like Example 1. After stirring fully, an aqueous solution of hydrochloric acid was added and the resulting mixture was solidified, dehydrated and dried. Results are shown in Table 1. Since the core-shell elastomer obtained in Comparative Example 1 does not contain as a constituent an acrylate or methacrylate component having an alicyclic skeleton in the shell phase, its compatibility with the cyclic olefin copolymer component is poor. As the result, the core-shell elastomer of Comparative Example 1 is inferior in transparency and Izod impact strength to those of Examples 1 to 5.

COMPARATIVE EXAMPLE 2

A core-shell elastomer shown in Table 1 was synthesized in the same manner as in Example 1 except that the weight ratio of styrene to butadiene for syntheses of the latexes A and B of Example 1 was changed from 25:75 to 60:40, and a composition comprising the copolymer I was prepared. Results are shown in Table 1. It is seen that the composition comprising the copolymer I is inferior in transparency and impact strength since the ratio of styrene to butadiene in Comparative Example 2 is outside the preferred range.

COMPARATIVE EXAMPLE 3 AND 4

A core-shell elastomer shown in Table 1 was synthesized by changing kinds and feed rates of monomers constituting core and shell components in the same manner as in Example 1 and compositions comprising the copolymer I were prepared. Results are shown in Table 1.

In Comparative Example 3, the impact strength of the composition was not improved because rubber was contained in the core component only in an amount of 30 parts by weight.

In Comparative Example 4, the impact strength of the composition was improved but its transparency was lowered (large Haze value) because the average primary particle diameter of the core-shell elastomer was beyond the range of the present invention.

In the following Examples 6 and 7, the process (second production process) for modifying an ordinary MBS resin with an (meth)acrylate having an alicyclic skeleton is described.

EXAMPLE 6

An attempt was made to modify the latex D (MBS resin) prepared in Example 1 with TD-A.

In other words, to a latex aqueous solution containing 100 parts by weight of a solid content of the latex D were continuously added 10 parts by weight of TD-A and 0.3 part of diisopropyl hydroperoxide over 3 hours to cause a reaction at 70° C.

After 3 hours of stirring, the conversion of TD-A was 99%. Results are shown in Table 1.

EXAMPLE 7

The procedure of Example 6 was repeated except that 10 parts by weight of TD-A in Example 6 and 9 parts by weight of NB-A were used. Results are shown in Table 1.

EXAMPLE 8 AND COMPARATIVE EXAMPLES 5 AND 6

Physical property values of cyclic olefin copolymers (copolymers I and II) obtained when a core-shell elastomer was not added are shown in Table 1 as Comparative Examples 5 and 6.

A composition obtained when the core-shell elastomer prepared in Example 1 was added to the copolymer II is shown as Example 8.

TABLE 1

Physical properties of core-shell elastomer

| | Core component (a) | | | Shell component (b) | | | | | |
| | Composition of Core component (wt. %) | | a/(a + b) × 100 | Composition of shell component (wt. %) | | | | b/(a + b) × 100 | Average diameter of primary particles | Refractive Index |
| | | | | Alicyclic (meth) acrylate | | | | | | |
| | Styrene | Butadiene | (wt. %) | Type | Amount | Styrene | MMA | (wt. %) | (nm) | |
|---|---|---|---|---|---|---|---|---|---|---|
| Ex. 1 | 25.0 | 75.0 | 70 | TD-A | 100 | 0 | 0 | 30 | 180 | 1.537 |
| Ex. 2 | 25.0 | 75.0 | 70 | TD-A | 50 | 23 | 27 | 30 | 200 | 1.537 |
| Ex. 3 | 25.0 | 75.0 | 82 | TD-A | 100 | 0 | 0 | 18 | 170 | 1.537 |
| Ex. 4 | 25.0 | 75.0 | 70 | NB-A | 60 | 40 | 0 | 30 | 190 | 1.536 |
| Ex. 5 | 25.0 | 75.0 | 70 | CH-MA | 50 | 50 | 0 | 30 | 210 | 1.537 |
| Comp. Ex. 1 | 25.0 | 75.0 | 70 | not used | 0 | 43 | 57 | 30 | 180 | 1.536 |
| Comp. Ex. 2 | 60.0 | 40.0 | 70 | TD-A | 100 | 0 | 0 | 30 | 200 | 1.554 |
| Comp. Ex. 3 | 25.0 | 75.0 | 30 | TD-A | 50 | 23 | 27 | 70 | 180 | 1.536 |
| Comp. Ex. 4 | 25.0 | 75.0 | 70 | TD-A | 100 | 0 | 0 | 30 | 450 | 1.537 |
| Ex. 6 | 25.0 | 75.0 | 60 | TD-A | 25 | 32 | 43 | 40 | 190 | 1.536 |
| Ex. 7 | 25.0 | 75.0 | 61 | NB-A | 23 | 33 | 44 | 39 | 190 | 1.533 |
| Comp. Ex. 5[1] | — | — | — | — | — | — | — | — | — | — |
| Ex. 8 | 25.0 | 75.0 | 70 | TD-A | 100 | 0 | 0 | 30 | 190 | 1.537 |
| Comp. Ex. 6[1] | — | — | — | — | — | — | — | — | — | — |

| | Polymer Composition | | Properties | | |
| | Cyclic olefin copolymer used | Core-shell elastomer (wt %) | Izod impact strength (kg-cm/cm) | Haze (%) | HDT (°C.) |
|---|---|---|---|---|---|
| Ex. 1 | Copolymer I | 20 | 15 | 4 | 135 |
| Ex. 2 | " | 20 | 12 | 4 | 135 |
| Ex. 3 | " | 20 | 20 | 4 | 133 |
| Ex. 4 | " | 20 | 14 | 4 | 135 |
| Ex. 5 | " | 20 | 12 | 5 | 134 |
| Comp. Ex. 1 | Copolymer I | 20 | 6 | 11 | 135 |
| Comp. Ex. 2 | " | 20 | 3 | 92 | 135 |
| Comp. Ex. 3 | " | 20 | 1 | 3 | 137 |
| Comp. Ex. 4 | " | 20 | 21 | 13 | 134 |
| Ex. 6 | Copolymer I | 23 | 10 | 5 | 135 |
| Ex. 7 | " | 23 | 11 | 5 | 135 |
| Comp. Ex. 5[1] | Copolymer I | 0 | 2 | 1 | 143 |
| Ex. 8 | Copolymer II | 20 | 29 | 4 | 68 |
| Comp. Ex. 6[1] | Copolymer II | 0 | 2 | 1 | 71 |

[1]Core-shell elastomer was not used.

Production Example 2, Examples 11 to 14 and Comparative Example 11 to be described below are intended to describe the second polymer composition.

PRODUCTION EXAMPLE 2

[synthesis example of cyclic olefin copolymer I (to be referred to as "copolymer III" hereinafter)]

Copolymerization between ethylene and tetracyclo [$4.4.0.1^{2,5}.1^{7,10}$]-3-dodecene (sometimes to be abbreviated as "TCD" hereinafter) was carried out continuously by the following method in the presence of a vanadium-based catalyst.

A solution of TCD in cyclohexane was continuously supplied from the top of a 1-liter glass-made reactor equipped with a stirring blade so that TCD supplied had a concentration of 40 g/liter in the reactor. As catalysts, a cyclohexane solution of VO(O.ethyl)Cl$_2$ was continuously supplied from the top of the reactor to maintain a vanadium concentration of 0.5 milli-mole/liter and a cyclohexane solution of ethyl aluminum sesquichloride (Al(C$_2$H$_5$)$_{1.5}$Cl$_{1.5}$) was continuously supplied from the top of the reactor to maintain an aluminum concentration of 4.0 milli-moles/liter in the reactor. Ethylene, nitrogen and hydrogen were fed to the polymerization system at a rate of 36.0 liters/hour, 35.0 liters/hour and 1.0 liter/hour, respectively, using a bubbling tube.

The polymerization system in which a heating medium was circulated in a jacket provided outside the reactor was maintained at 10° C. to carry out a copolymerization reaction. A solution of a copolymer produced by this copolymerization reaction was withdrawn continuously from the top of the reactor so that the amount of the polymer liquid in the reactor was always maintained at 1 liter (i.e., an average residence time was allowed to be 0.5 hour). To this withdrawn copolymer solution was added a liquid mixture of cyclohexane and isopropyl alcohol (1:1) to stop the polymerization reaction. Thereafter, a solution of 5 ml of concentrated hydrochloric acid in 1 liter of water and the polymer liquid were contacted in a proportion of 1:1 under strong agitation using a homo-mixer so that the residual catalyst was shifted to an aqueous phase. After this contacted liquid mixture was left to stand and the aqueous phase was separated to remove, the mixture was washed with distilled water two times to purify and separate the polymer liquid phase.

The polymer liquid purified and separated was then brought into contacte with three volumes of acetone under strong agitation to precipitate a copolymer and then this solid content was collected by filtration and washed fully with acetone. Further, to extract unreacted TCD present in the copolymer, this solid content was added to acetone to have a concentration of 40 g/liter and subjected to an extraction treatment at 60° C. for 2 hours. After the extraction treatment, the solid content was collected by filtration and dried at 130° C. at 350 mmHg for 12 hours in a nitrogen gas current.

The ethylene-TCD copolymer thus obtained (to be referred to as "copolymer III" hereinafter) had an intrinsic viscosity [η] of 0.65 dl/g, a Tg of 82° C., a TCD content of 28.1 mol %, and an iodine value of 0.1 g (iodine)/100 g.

The copolymer III had a refractive indx (n$_D$) of 1.538.

[synthesis example of core-shell elastomer [B']]

(1) Source materials were charged into an autoclave equipped with a stirrer and fully substituted with nitrogen to achieve the following composition and stirred for 15 hours at 50° C. to effect a reaction.

| | |
|---|---|
| butadiene | 75 parts |
| styrene | 25 parts |
| polyethylene glycol dimethacrylate | 1.0 part |
| diisopropylbenzene hydroperoxide | 0.2 part |
| sodium formaldehyde sulfoxylate | 0.2 part |
| ethylene diamine tetraacetic acid (EDTA).2 sodium salt | 0.006 part |
| ferrous sulfate.7H$_2$O | 0.002 part |
| sodium pyrophosphate | 0.3 part |
| sodium oleate | 2.0 parts |
| ion exchange water | 200 parts |

A rubber latex having a conversion rate of 98% and an average particle diameter of 80 nm (to be referred to as "latex E" hereinafter) was obtained.

(2) The thus obtained latex E was charged into an autoclave equipped with a stirrer and fully substituted with nitrogen to achieve the following composition, and polymerized at 50° C. for 50 hours.

| | |
|---|---|
| Latex E (as solid content) | 8 parts |
| styrene | 23 parts |
| butadiene | 69 parts |
| diisopropylbenzene hydroperoxide | 0.1 part |
| sodium formaldehyde sulfoxylate | 0.1 part |
| EDTA.2 sodium salt | 0.004 part |
| ferrous sulfate.7H$_2$O | 0.001 part |
| sodium pyrophosphate | 0.3 part |
| sodium oleate | 0.5 part |
| ion exchange water | 150 parts |

At intervals of 10 hours after start of a reaction, 0.1 part of diisopropylbenzene hydroperoxide and 0.1 part of sodium formaldehyde sulfoxylate were added. Meanwhile, a 1% aqueous solution of 1.5 parts of sodium oleate was continuously added over 40 hours to the mixture. The final conversion rate was almost 95% and the resulting rubber latex (to be referred to as "latex F" hereinafter) had an average particle diameter of 170 nm. When the latex F was observed through an electron microscope, there were no latex particles having a particle diameter of not more than 100 nm and not less than 300 nm.

As described above, a styrene-butadiene latex (latex F) containing 25% by weight of styrene and 75% by weight of butadiene could be synthesized as a core component.

(3) A core-shell elastomer was synthesized using the latex F in the following manner.

Source materials were charged into a glass container while being substituted with nitrogen to achieve the following composition and stirred at 70° C.

| | |
|---|---|
| latex F (solid content) | 70 parts |
| EDTA.2 sodium salt | 0.008 part |
| ferrous sulfate.7H$_2$O | 0.002 part |
| sodium formaldehyde sulfoxylate | 0.2 part |
| ion exchange water | 250 parts |

To the above mixture was added continuously the following composition over 2 hours.

| | |
|---|---|
| methyl methacrylate | 17 parts |
| polyethylene glycol dimethacrylate | 1.0 part |
| diisopropylbenzene hydroperoxide | 0.1 part |

When stirring was further continued for one hour after completion of addition, conversion rate was 98%. Further, the following composition was continuously added over 2 hours.

| styrene | 13 parts |
|---|---|
| diisopropylbenzene hydroperoxide | 0.2 part |

When 0.1 part of diisopropylbenzene hydroperoxide was added after completion of addition and stirring was continued for another 3 hours, the conversion was 98%. The thus obtained latex (to be referred to as "latex G" hereinafter) had an average particle diameter of 180 rm. When the latex G was observed through an electron microscope, there were no latex particles having a diameter of not more than 100 nm and not less than 300 nm.

To the thus obtained latex G were added 1 part of 2,6-di-tertiary butyl-p-cresol (BHT) and 0.5 part of dilaurylthiodipropyonate. After stirring fully, an aqueous solution of hydrochloric acid was added to the mixture and the resulting mixture was solidified, dehydrated and dried.

EXAMPLE 11

A mixture comprising 80 parts by weight of the cyclic olefin copolymer (copolymer III) shown in the above Production Example 2, 20 parts by weight of the core-shell elastomer shown in the above syntheses example of the component [B'], and 3 parts by weight of petroleum resin [Escorez 5320 (manufactured by Tonex)] as the component C was mixed well in a plastic bag in a nitrogen atmosphere and substitution with nitrogen was conducted for 2 hours. The resulting mixture was melt blended by a twin screw extruder (TW100, manufactured by Haake) at the maximum cylinder temperature of 200° C. for a residence time of 1 minute and pelletized by a pelletizer. Results are shown in Table 2.

EXAMPLE 12

A composition was prepared in the same manner as in Example 11 except that $FTR_{6100}$ (manufactured by Mitsui Petrochemical Industries, Ltd.) was used as the component C. Results are shown in Table 2.

EXAMPLE 13

A composition was prepared in the same manner as in Example 11 except that 1.5 parts by weight of polyethylene wax (Mitsui Hiwax 110P) and 1.5 parts by weight of polyethylene wax (Mitsui Hiwax 1120H) (both manufactured by Mitsui Petrochemical Industries, Ltd) were used as the component C. Results are shown in Table 2.

EXAMPLE 14

A composition was prepared in the same manner as in Example 11 except that the SH710 silicone oil (manufactured by Toray Silicone Co.) was used as the component C. Results are shown in Table 2.

COMPARATIVE EXAMPLE 11

A composition was prepared in the same manner as in Example 11 except that nothing was added as the component C. Results are shown in Table 2.

TABLE 2

| | Cyclic olefin copolymer [A] (part by weight) | Core-shell elastomer [B'] (part by weight) | Lubricant [C] Kind | Lubricant [C] part by weight | Properties of composition Izod impact strength (kg · cm/cm) | Properties of composition Haze (%) |
|---|---|---|---|---|---|---|
| Example 1 | 80 | 20 | ESCOREZ 5320 | 3 | 7 | 7 |
| Example 2 | 80 | 20 | FTR6100 | 3 | 7 | 7 |
| Example 3 | 80 | 20 | 110P/1120H | 3 | 7 | 6 |
| Example 4 | 80 | 20 | SH710 | 3 | 16 | 10 |
| Comparative Example 1 | 80 | 20 | — | — | 9 | 14 |

What is claimed is:

1. A core-shell elastomer, wherein the core-shell elastomer is obtained by graft polymerizing 100 parts by weight of a core-shell elastomer which contains (B-1) 40 to 85 parts by weight of a core component which comprises styrene-butadiene copolymer rubber including 50% or less by weight of styrene unit and (B-2") 15 to 60 parts by weight of a shell component which comprises a copolymer having a unit derived from a monomer mixture consisting of (b-2) 20 to 80% by weight of a monovinyl aromatic monomer, (b-3) 20 to 80% by weight of other monovinyl monomer, and (b-4) 0 to 3% by weight of a polyfunctional monomer with (B-2''') 5 to 100 parts by weight of at least one acrylate or methacrylate having an alicyclic skeleton and selected from the group consisting of:

compounds represented by a formula (III):

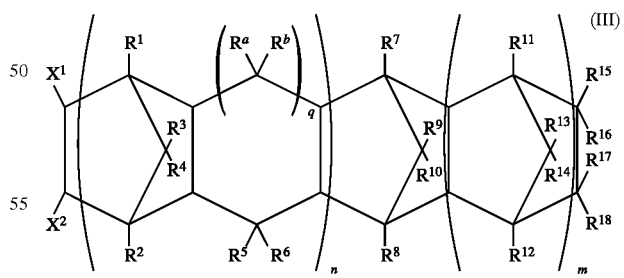

wherein n is 0 or 1, m is 0 or a positive integer, q is 0 or 1, $R^1$ to $R^{18}$ and $R^a$ and $R^b$ are independently selected from the group consisting of a hydrogen atom, a halogen atom and a hydrocarbon group, $R^{15}$ to $R^{18}$ may be bonded together to form a single ring or multiple rings, the single ring or the multiple rings may have a double bond, $R^{15}$ and $R^{16}$, or $R^{17}$ and $R^{18}$ may form an alkylidene group, either one of $X^1$ and $X^2$ is an acryloyloxy group or a methacryloyloxy group represented by a formula (X):

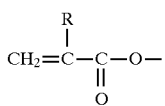
(X)

wherein R is a hydrogen atom or a methyl group, and the other is a hydrogen atom or an ethyl group;
compounds represented by a formula (IV):

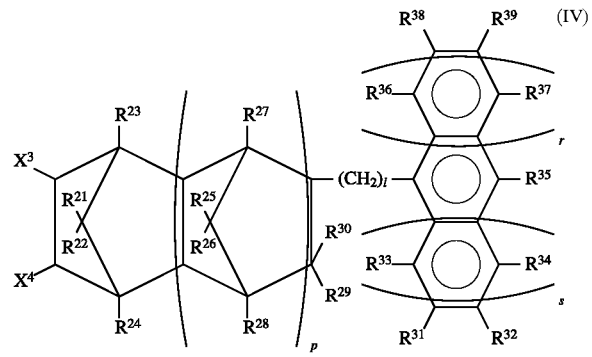
(IV)

wherein p and l are each 0 or an integer of 1 or more, r and s are 0, 1 or 2, $R^{21}$ to $R^{39}$ are independently selected from the group consisting of a hydrogen atom, a halogen atom, an aliphatic hydrocarbon group, an aromatic hydrocarbon group and an alkoxy group, the carbon atom to which $R^{29}$ and $R^{30}$ are bonded and the carbon atom to which $R^{33}$ is bonded or the carbon atom to which $R^{31}$ is bonded may be bonded together directly or via an alkylene group having 1 to 3 carbon atoms, $R^{35}$ and $R^{32}$, or $R^{35}$ and $R^{39}$ may be bonded together to form a single aromatic ring or multiple aromatic rings when r=s=0, either one of $X^3$ and $X^4$ is an acryloyloxy group represented by the formula (X), and the other is a hydrogen atom or an alkyl group; and compounds represented by a formula (V):

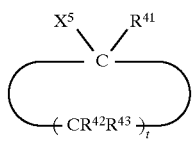
(V)

wherein t is 4 or 5, $R^{41}$ to $R^{43}$ are independently selected from the group consisting of a hydrogen atom, a halogen atom and a hydrocarbon group, and $X^5$ is an acryloyloxy group or a methacryloyloxy group represented by the formula (X).

* * * * *